US009668164B2

(12) United States Patent
Richley et al.

(10) Patent No.: US 9,668,164 B2
(45) Date of Patent: May 30, 2017

(54) RECEIVER PROCESSOR FOR BANDWIDTH MANAGEMENT OF A MULTIPLE RECEIVER REAL-TIME LOCATION SYSTEM (RTLS)

(71) Applicant: ZIH Corp., Lincolnshire, IL (US)

(72) Inventors: Edward A. Richley, Gaithersburg, MD (US); Belinda Turner, Germantown, MD (US); Chang Wang, Boyds, MD (US); Aitan Ameti, Germantown, MD (US)

(73) Assignee: ZIH Corp., Lincolnshire, IL (US)

( * ) Notice: Subject to any disclaimer, the term of this patent is extended or adjusted under 35 U.S.C. 154(b) by 147 days.

(21) Appl. No.: 14/678,079

(22) Filed: Apr. 3, 2015

(65) Prior Publication Data

US 2015/0358852 A1 Dec. 10, 2015

Related U.S. Application Data

(60) Provisional application No. 62/008,243, filed on Jun. 5, 2014.

(51) Int. Cl.
*H04W 4/00* (2009.01)
*H04W 28/02* (2009.01)
(Continued)

(52) U.S. Cl.
CPC ....... *H04W 28/0226* (2013.01); *H04W 4/023* (2013.01); *H04W 28/0278* (2013.01); *H04W 56/001* (2013.01); *H04L 47/34* (2013.01)

(58) Field of Classification Search
CPC ............. H04W 28/0226; H04W 4/023; H04W 56/001; H04W 28/0278; H04W 47/34
See application file for complete search history.

(56) References Cited

U.S. PATENT DOCUMENTS 3,732,500 A 5/1973 Dishal et al.
5,119,104 A 6/1992 Heller
(Continued)

FOREIGN PATENT DOCUMENTS

EP 1235077 A2 8/2002
EP 1241616 A2 9/2002
(Continued)

OTHER PUBLICATIONS

Defendant's Answer to Complaint before the United States District Court of Massachusetts, Civil Action No. 1:15-cv-12297, Lynx System Developers, Inc. et al. V. Zebra Enterprise Solutions Corporation et al., filed Apr. 6, 2016.
(Continued)

*Primary Examiner* — Robert Wilson

(57) ABSTRACT

A method, apparatus and computer program product are provided for an active bandwidth management system for a tag target location system. A method is provided including determining a buffer fullness level for a receive buffer in a receiver in a set of one or more receivers, determining, by the processor hub, a set of buffer elements to be removed from the receive buffer in at least one of the receivers based on the buffer fullness level, and communicating to the one or more receivers to remove from the receive buffers the set of receive buffer elements identified by a sequence number.

11 Claims, 8 Drawing Sheets

(51) Int. Cl.

| | |
|---|---|
| ***H04W 4/02*** | (2009.01) |
| ***H04W 56/00*** | (2009.01) |
| *H04L 12/801* | (2013.01) |

(56) References Cited

U.S. PATENT DOCUMENTS 5,469,409 A 11/1995 Anderson et al.
5,513,854 A 5/1996 Daver
5,645,077 A 7/1997 Foxlin
5,699,244 A 12/1997 Clark et al.
5,901,172 A 5/1999 Fontana et al.
5,920,287 A 7/1999 Belcher et al.
5,930,741 A 7/1999 Kramer
5,995,046 A 11/1999 Belcher et al.
6,028,626 A 2/2000 Aviv
6,121,926 A 9/2000 Belcher et al.
6,176,837 B1 1/2001 Foxlin
6,204,813 B1 3/2001 Wadell et al.
6,366,242 B1 4/2002 Boyd et al.
6,380,894 B1 4/2002 Boyd et al.
6,593,885 B2 7/2003 Wisherd et al.
6,655,582 B2 12/2003 Wohl et al.
6,710,713 B1 3/2004 Russo
6,812,884 B2 11/2004 Richley et al.
6,836,744 B1 12/2004 Asphahani et al.
6,882,315 B2 4/2005 Richley et al.
7,009,638 B2 3/2006 Gruber et al.
7,190,271 B2 3/2007 Boyd
7,667,604 B2 2/2010 Ebert et al.
7,671,802 B2 3/2010 Walsh et al.
7,710,322 B1 5/2010 Ameti et al.
7,755,541 B2 7/2010 Wisherd et al.
7,899,006 B2 * 3/2011 Boyd ..................... G01S 5/021 370/328
7,969,348 B2 6/2011 Baker et al.
8,077,981 B2 12/2011 Elangovan et al.
8,269,835 B2 9/2012 Grigsby
8,279,051 B2 10/2012 Khan
8,477,046 B2 7/2013 Alonso
8,568,278 B2 10/2013 Riley et al.
8,696,458 B2 4/2014 Foxlin et al.
8,705,671 B2 4/2014 Ameti et al.
8,775,916 B2 7/2014 Pulsipher et al.
8,780,204 B2 7/2014 DeAngelis et al.
8,795,045 B2 8/2014 Sorrells et al.
8,842,002 B2 9/2014 Rado
8,989,880 B2 3/2015 Wohl et al.
9,081,076 B2 7/2015 DeAngelis et al.
9,381,645 B1 7/2016 Yarlagadda et al.
2001/0010541 A1 8/2001 Fernandez et al.
2001/0030625 A1 10/2001 Doles et al.
2002/0004398 A1 1/2002 Ogino et al.
2002/0041284 A1 4/2002 Konishi et al.
2002/0114493 A1 8/2002 McNitt et al.
2002/0116147 A1 8/2002 Vock et al.
2002/0130835 A1 9/2002 Brosnan
2002/0135479 A1 9/2002 Belcher et al.
2003/0090387 A1 5/2003 Lestienne et al.
2003/0095186 A1 5/2003 Aman et al.
2003/0128100 A1 7/2003 Burkhardt et al.
2003/0227453 A1 12/2003 Beier et al.
2004/0022227 A1 * 2/2004 Lynch ................... G06Q 10/06 370/338
2004/0062216 A1 4/2004 Nicholls et al.
2004/0108954 A1 6/2004 Richley et al.
2004/0178960 A1 9/2004 Sun
2004/0249969 A1 * 12/2004 Price ................ H04L 29/06027 709/231
2004/0260470 A1 12/2004 Rast
2004/0260828 A1 * 12/2004 Price ................ H04L 29/06027 709/231
2005/0026563 A1 2/2005 Leeper et al.
2005/0031043 A1 2/2005 Paquelet
2005/0059998 A1 3/2005 Norte et al.
2005/0075079 A1 4/2005 Jei et al.
2005/0093976 A1 5/2005 Valleriano
2005/0148281 A1 7/2005 Sanchez-Castro et al.
2005/0207617 A1 9/2005 Sarnoff
2006/0067324 A1 3/2006 Kim
2006/0139167 A1 6/2006 Davie et al.
2006/0164213 A1 7/2006 Burghard et al.
2006/0252476 A1 11/2006 Bahou
2006/0271912 A1 * 11/2006 Mickle ................... G06F 8/355 717/106
2006/0281061 A1 12/2006 Hightower et al.
2007/0091292 A1 4/2007 Cho et al.
2007/0176749 A1 8/2007 Boyd et al.
2007/0296723 A1 12/2007 Williams
2008/0065684 A1 3/2008 Zilberman
2008/0106381 A1 * 5/2008 Adamec ............... G06K 7/0008 340/10.2
2008/0113787 A1 5/2008 Alderucci
2008/0129825 A1 6/2008 DeAngelis et al.
2008/0140233 A1 6/2008 Seacat
2008/0186231 A1 8/2008 Aljadeff et al.
2008/0204248 A1 8/2008 Winget et al.
2008/0262885 A1 * 10/2008 Jain ................... G06Q 10/0633 705/7.27
2008/0266131 A1 10/2008 Richardson et al.
2008/0269016 A1 10/2008 Ungari et al.
2008/0281443 A1 11/2008 Rodgers
2008/0285805 A1 11/2008 Luinge et al.
2009/0048044 A1 2/2009 Oleson et al.
2009/0141736 A1 6/2009 Becker
2009/0231198 A1 9/2009 Wlash et al.
2010/0026809 A1 2/2010 Curry
2010/0045508 A1 2/2010 Ekbal et al.
2010/0054304 A1 3/2010 Barnes et al.
2010/0060452 A1 3/2010 Schuster et al.
2010/0150117 A1 6/2010 Aweya et al.
2010/0228314 A1 9/2010 Goetz
2010/0250305 A1 9/2010 Lee et al.
2010/0278386 A1 11/2010 Hoeflinger
2010/0283603 A1 11/2010 Alonso
2010/0283630 A1 11/2010 Alonso
2010/0328073 A1 12/2010 Nikitin et al.
2011/0002223 A1 1/2011 Gross
2011/0025847 A1 2/2011 Park et al.
2011/0054782 A1 3/2011 Kaahui et al.
2011/0063114 A1 3/2011 Ikoyan
2011/0084806 A1 4/2011 Pekins et al.
2011/0134240 A1 6/2011 Anderson et al.
2011/0140970 A1 6/2011 Fukagawa et al.
2011/0169959 A1 7/2011 DeAngelis et al.
2011/0188513 A1 8/2011 Christoffersson et al.
2011/0195701 A1 8/2011 Cook et al.
2011/0261195 A1 10/2011 Martin et al.
2011/0300905 A1 12/2011 Levi
2011/0320322 A1 12/2011 Roslak et al.
2012/0014278 A1 1/2012 Ameti et al.
2012/0015665 A1 1/2012 Farley et al.
2012/0024516 A1 2/2012 Bhadurt et al.
2012/0042326 A1 2/2012 Jain et al.
2012/0057634 A1 3/2012 Shi et al.
2012/0057640 A1 3/2012 Shi et al.
2012/0065483 A1 3/2012 Chung
2012/0081531 A1 4/2012 DeAngelis et al.
2012/0112904 A1 5/2012 Nagy et al.
2012/0126973 A1 5/2012 DeAngelis et al.
2012/0139708 A1 6/2012 Paradiso et al.
2012/0184878 A1 7/2012 Najafi et al.
2012/0212505 A1 8/2012 Burroughs et al.
2012/0218301 A1 8/2012 Miller
2012/0225676 A1 9/2012 Boyd et al.
2012/0246795 A1 10/2012 Scheffler et al.
2012/0256745 A1 10/2012 Plett et al.
2012/0268239 A1 10/2012 Ljung et al.
2013/0003860 A1 1/2013 Sasai et al.
2013/0021142 A1 1/2013 Matsui et al.
2013/0021206 A1 1/2013 Hach et al.
2013/0040574 A1 2/2013 Hillyard
2013/0041590 A1 2/2013 Burich et al.
2013/0066448 A1 3/2013 Alonso
2013/0076645 A1 3/2013 Anantha et al.

(56) References Cited

U.S. PATENT DOCUMENTS

2013/0096704 A1 4/2013 Case
2013/0138386 A1 5/2013 Jain et al.
2013/0142384 A1 6/2013 Ofek
2013/0257598 A1 10/2013 Kawaguchi et al.
2013/0339156 A1 12/2013 Sanjay et al.
2014/0055588 A1 2/2014 Bangera et al.
2014/0145828 A1 5/2014 Bassan-Eskenazi
2014/0156036 A1 6/2014 Huang
2014/0170607 A1 6/2014 Hsiao et al.
2014/0221137 A1 8/2014 Krysiak et al.
2014/0320660 A1 10/2014 DeAngelis et al.
2014/0361875 A1 12/2014 O'Hagan et al.
2014/0361906 A1 12/2014 Hughes et al.
2014/0364141 A1 12/2014 O'Hagan et al.
2014/0365415 A1 12/2014 Stelfox et al.
2015/0002272 A1 1/2015 Alonso et al.
2015/0057981 A1 2/2015 Gross
2015/0085111 A1 3/2015 Lavery
2015/0097653 A1 4/2015 Gibbs et al.
2015/0355311 A1 12/2015 O'Hagan et al.
2015/0358852 A1* 12/2015 Richley ............. H04W 28/0226 370/328
2015/0360133 A1 12/2015 MacCallum et al.
2015/0375041 A1 12/2015 Richley et al.
2015/0375083 A1 12/2015 Stelfox et al.
2015/0378002 A1 12/2015 Hughes et al.
2015/0379387 A1* 12/2015 Richley .............. G06K 19/0702 235/492
2016/0097837 A1* 4/2016 Richley ..................... G01S 5/02 342/465

FOREIGN PATENT DOCUMENTS

EP 1253438 A2 10/2002
EP 1503513 A1 2/2005
EP 2474939 A1 11/2012
WO WO 98/05977 2/1998
WO WO 99/61936 A1 12/1999
WO WO 0108417 2/2001
WO WO 2006/022548 3/2006
WO WO-2010/083943 A1 7/2010
WO WO 2014197600 12/2014
WO WO 2015/051813 A1 4/2015

OTHER PUBLICATIONS

International Search Report and Written opinion from International Application No. PCT/US2014/040881 dated Nov. 4, 2014.

International Search Report and Written opinion from International Application No. PCT/US2014/040940 dated Dec. 17, 2014.

International Search Report and Written Opinion from International Application No. PCT/US2014/041062 dated Oct. 1, 2014.

International Search Report and Written Opinion from International Application No. PCT/US2014/040947 dated Oct. 9, 2014.

Fontana, R.J., Richley, E., Barney, J., "Commercialization of an Ultra Wideband Precision Assest Location System", *2003 IEEE Conference on Ultra Wideband Systems and Technologies*, Nov. 16-19, 2003, pp. 369-373.

Guéziec, A., "Tracking a Baseball Pitch for Broadcast Television," Mar. 2002, <http://www.trianglesoftware.com/pitch_tracking.htm>, pp. 38-43.

CattleLog Pro, *eMerge Interactive, Inc.*, Sebastian, FL, 2004, pp. 1-2.

Marchant, J., "Secure Animal Indetification and Source Verification", *JM Communications*, UK, 2002, pp. 1-28.

"A guide to Using NLIS Approved Ear Tags and Rumen Boluses", National Livestock Identification Scheme, *Meat & Livestock Australia Limited*, North Sydney, Australia, May 2003, pp. 1-4.

King L., "NAIS Cattle ID Pilot Projects Not Needed, Since Proven Advanced Technology Already Exisits", *ScoringSystem, Inc.*, Sarasota, FL, Dec. 27, 2005(www.prweb.com/releases2005/12prweb325888.htm), pp. 1-2.

"RFID in the Australian Meat and Livestock Industry", Allflex Australia Pty Ltd., Capalaba, QLD (AU), *Data Capture Suppliers Guide*, 2003-2004, pp. 1-3.

U.S. Appl. No. 14/296,703, filed Jun. 5, 2014; In re: Alonso et al., entitled Method and Apparatus for Associating Radio Frequency Identification Tags with Participants.

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".

International Search Report and Written Opinion for International Application No. PCT/IB2015/059264 dated Feb. 10, 2016.

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

International Search Report and Written Opinion for International Application No. PCT/US2015/034267 dated Sep. 25, 2015.

International Search Report and Written Opinion for International Application No. PCT/IB2015/054103 dated Aug. 14, 2015.

Cheong, P. et al., "Synchronization, TOA and Position Estimation for Low-Complexity LDR UWB Devices", Ultra-Wideband, 2005 IEEE International Conference, Zurich, Switzerland Sep. 05-08, 2005, Piscataway, NJ, USA, IEEE, Sep. 5, 2005, pp. 480-484.

International Search Report and Written Opinion for International Application No. PCT/IB2015/054213 dated Aug. 6, 2015.

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

International Search Report and Written Opinion for International Application PCT/IB2015/054102 dated Nov. 4, 2015.

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.

Bahle et al., "I See You: How to Improve Wearable Activity Recognition by Leveraging Information from Environmental Cameras," Pervasive Computing and Communications.Workshops, IEEE International Conference, (Mar. 18-22, 2013).

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Complaint before the United States District Court of Massachusetts, Civil Action No. 1:15-cv-12297, Lynx System Developers, Inc. et al. V. Zebra Enterprise Solutions Corporation et al., filed Mar. 23, 2016.

International Search Report for International Application No. PCT/US2014/053647 dated Dec. 19, 2014.

International Search Report and Written Opinion for International Application No. PCT/US2016/035614 dated Sep. 15, 2016.

Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

Swedberg, Claire, "USDA Researchers Develop System to Track Livestock Feeding Behavior Unobtrusively", RFID Journal, Jul. 18, 2013, pp. 1-2.

Invention to Pay Additional Fees/Partial International Search Report for PCT/IB2015/054099 dated Oct. 6, 2015.

International Search Report and Written Opinion for International Application No. PCT/IB2015/054099 dated Dec. 9, 2015.

Complaint before the United Stated District Court of Massachusetts, Civil Action No. 1:15-cv-12297, Lynx System Developers, Inc. et al. v. Zebra Enterprise Solutions Corporation et al., filed Jun. 10, 2015.

(56) References Cited

OTHER PUBLICATIONS

European Search Report for European Patent Application No. 14806811.7 dated Dec. 9, 2016.

* cited by examiner

200A

| | RECEIVER NO. | | | | | |
|---|---|---|---|---|---|---|
| SEQUENCE NO. | RCR1 13a | RCR2 13b | RCR3 13c | RCR4 13d | RCR5 13e | RCR6 13f |
| 0001 | | | | | | |
| 0002 | | | | | | |
| 0003 | | | | | | |
| 0004 | | | | | | |
| 0005 | | | | | | |
| 0006 | | | | | | |
| 0007 | | | | | | |
| 0008 | | | | | | |

RECEIVER PROCESSOR FOR BANDWIDTH MANAGEMENT OF A MULTIPLE RECEIVER REAL-TIME LOCATION SYSTEM (RTLS)

CROSS-REFERENCE TO RELATED APPLICATIONS

This application claims priority to U.S. Provisional Application Ser. No. 62/008,243, filed Jun. 5, 2014, the entire contents of each is incorporated by reference herein in its entirety.

FIELD

Embodiments discussed herein are related to radio frequency locating and, more particularly, to systems, methods, apparatuses, computer readable media and other means for target location by high-resolution time-of-arrival (TOA) determination in a multiple receiver target location system.

BACKGROUND

A number of deficiencies and problems associated with UWB Real Time Locating Systems particularly related to bandwidth management are identified herein. Through applied effort, ingenuity, and innovation, exemplary solutions too many of these identified problems are embodied by Example embodiments of the present invention may include, which is described in detail below.

BRIEF SUMMARY OF THE INVENTION

In some examples, systems, methods, apparatuses, and computer readable media are disclosed for providing a bandwidth management of a multiple receiver real-time target location system (RTLS). In some examples, a method, apparatus, and computer program product (CPP) for a bandwidth management of a multiple receiver target location system is described herein, comprising determining a buffer fullness level for a receive buffer in a receiver in a set of one or more receivers, determining by the processor hub a set of buffer elements to be removed from the receive buffer in at least one of the receivers based on the buffer fullness level, and communicating to the one or more receivers to remove from the receive buffers the set of receive buffer elements identified by a sequence number.

In some examples, the method, apparatus, and CPP further comprises determining a buffer fullness level for a receive buffer comprises determining a total number of sequence numbers in the buffer. The sequence numbers are associated with tag transmitters. The determining the buffer fullness level may comprise a mapping of a total number of sequence numbers associated with each tag.

In some examples, determining the, the buffer fullness level may comprise receiving the buffer fullness level at the processor hub on one or more of an RF communication channel and an RS-422 communication channel.

In some examples, the determining the set of buffer elements to be removed comprises determining of a time-of-arrival (TOA) invalidity at the multiple receivers. The TOA invalidity may comprise one or more of determining an out-of-range TOA, an intermittent TOA, and an indeterminate TOA or the like. The determining the set of buffer elements to be removed comprises, in some examples, a determining of a location estimate invalidity at a Central Processor/Hub.

In some examples, the method, apparatus, and CPP may be further specified, whereby the determining the location estimate invalidity comprises one or more of determining a non-physical location estimate, an out-of-range location estimate, a location estimate intermittently 'skipping' between two or more location estimates, and an under-determined location estimate. The determining the location estimate invalidity may further comprise a determining of an updated location estimate with a subset of the TOAs and receivers used make the location estimate. The determining the updated location estimate may comprise an iterative feedback loop. The iterative feedback loop, in some examples, compares an error function associated with the updated location estimate and the location estimate to determine a minimum error.

In some examples, communicating to remove the set of receiver buffer elements identified by the sequence number comprises one or more of a data compression command and a pruning command. The data compression command comprises, in some examples, one or more of a data word compression, an RFID transmitter identification (TX ID) compression, and a CRC compression. The pruning command comprises a pruning as a function of invalid TOAs, invalid locations, and updated locations. The pruning command may comprise a mapping of an RFID TX ID, a sequence number, and a set of receivers. The pruning command may be indexed to remove one or more sequence numbers from the receive buffers of one or more receivers.

BRIEF DESCRIPTION OF THE SEVERAL VIEWS OF THE DRAWINGS

Figure 1:
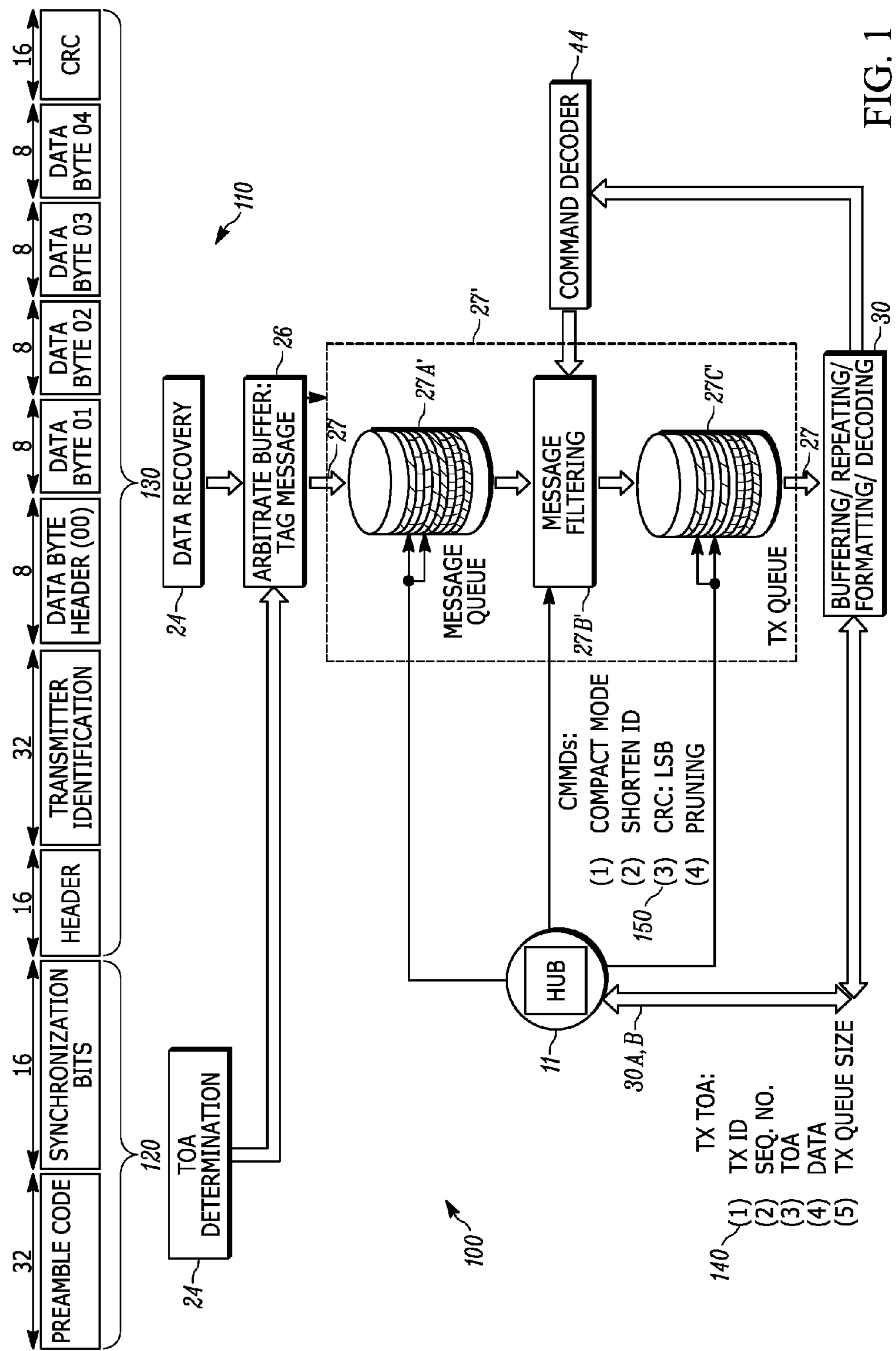
Figure 2A:
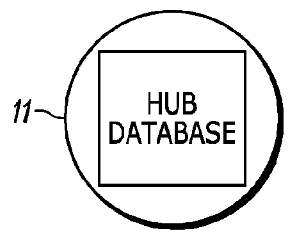
Figure 2B:
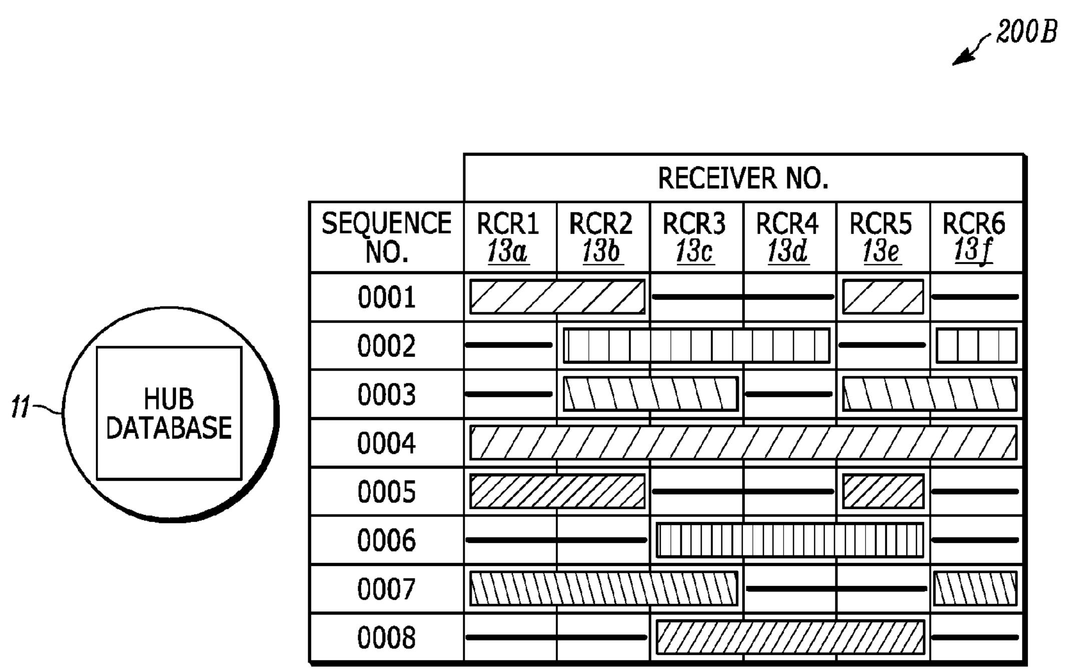
Figure 3:
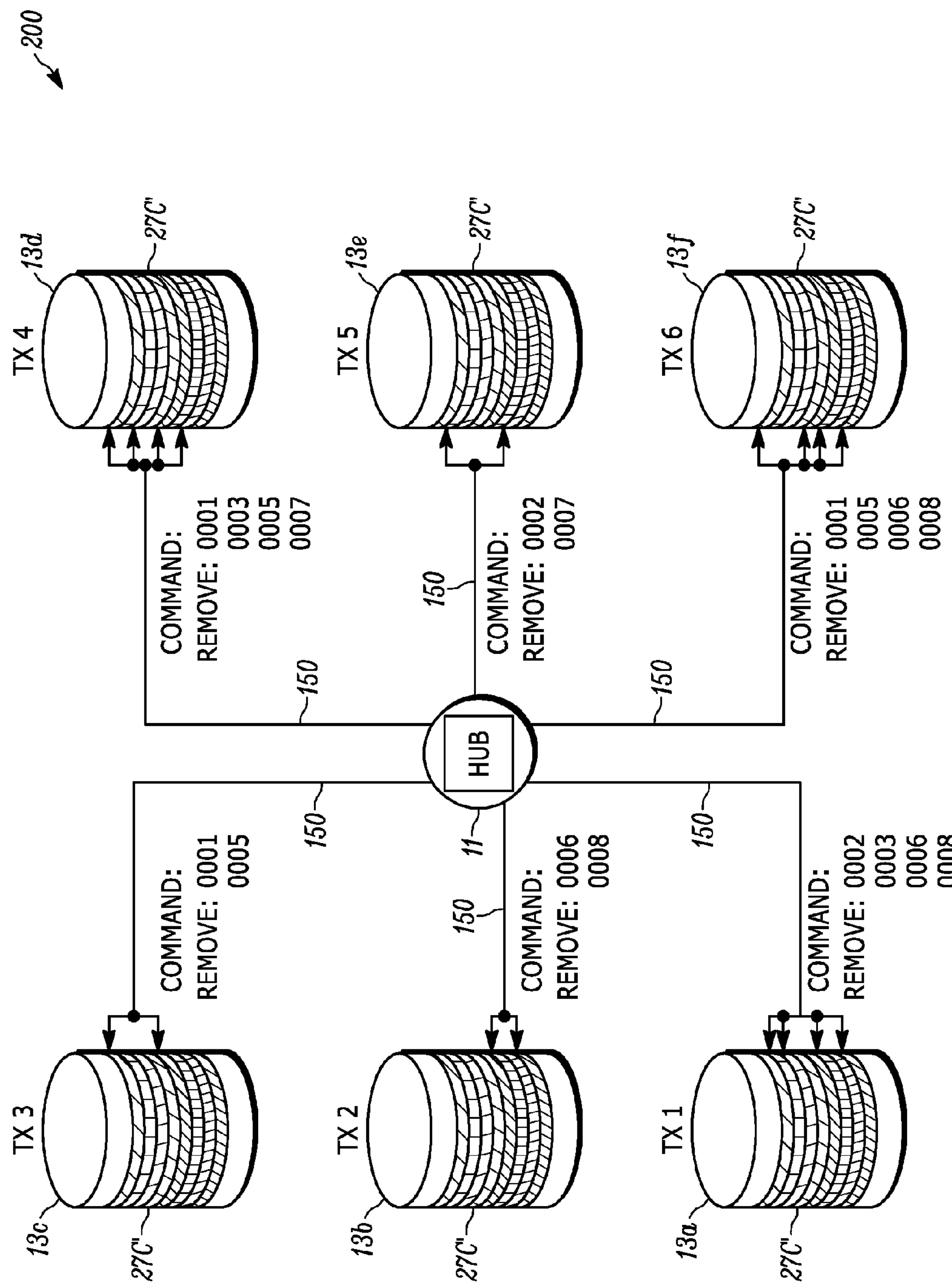
Figure 4:
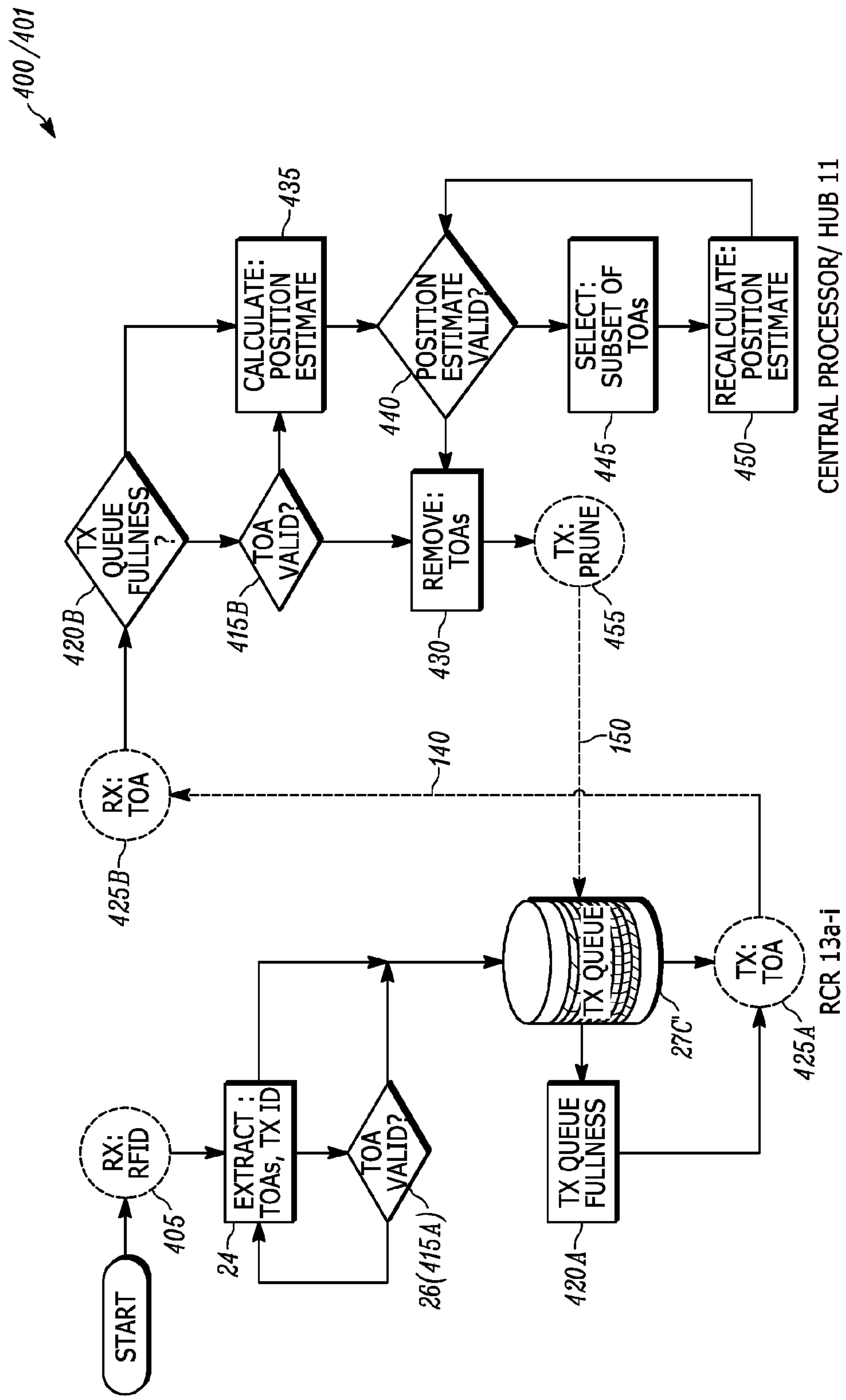
Figure 5:
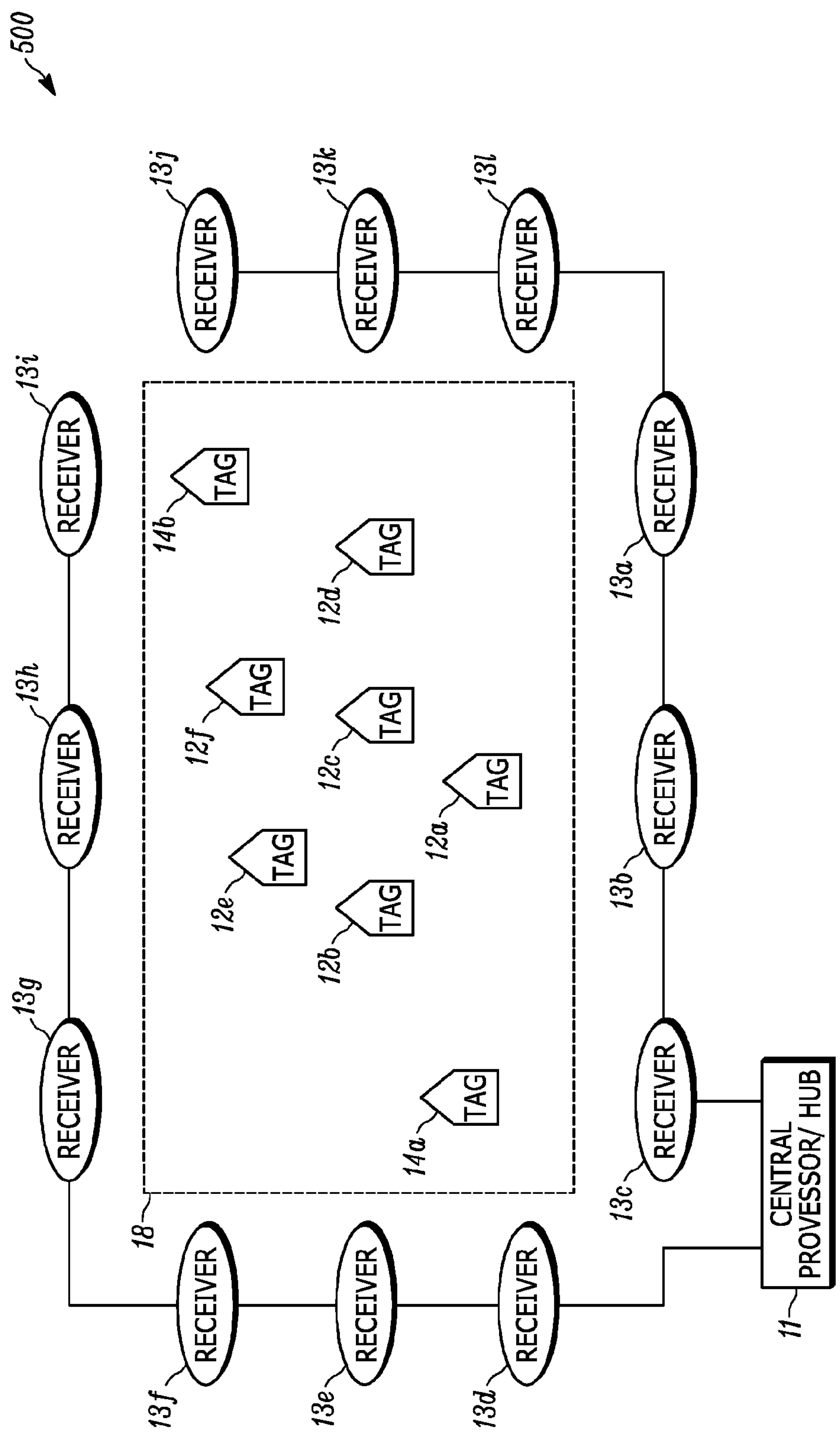
Figure 6:
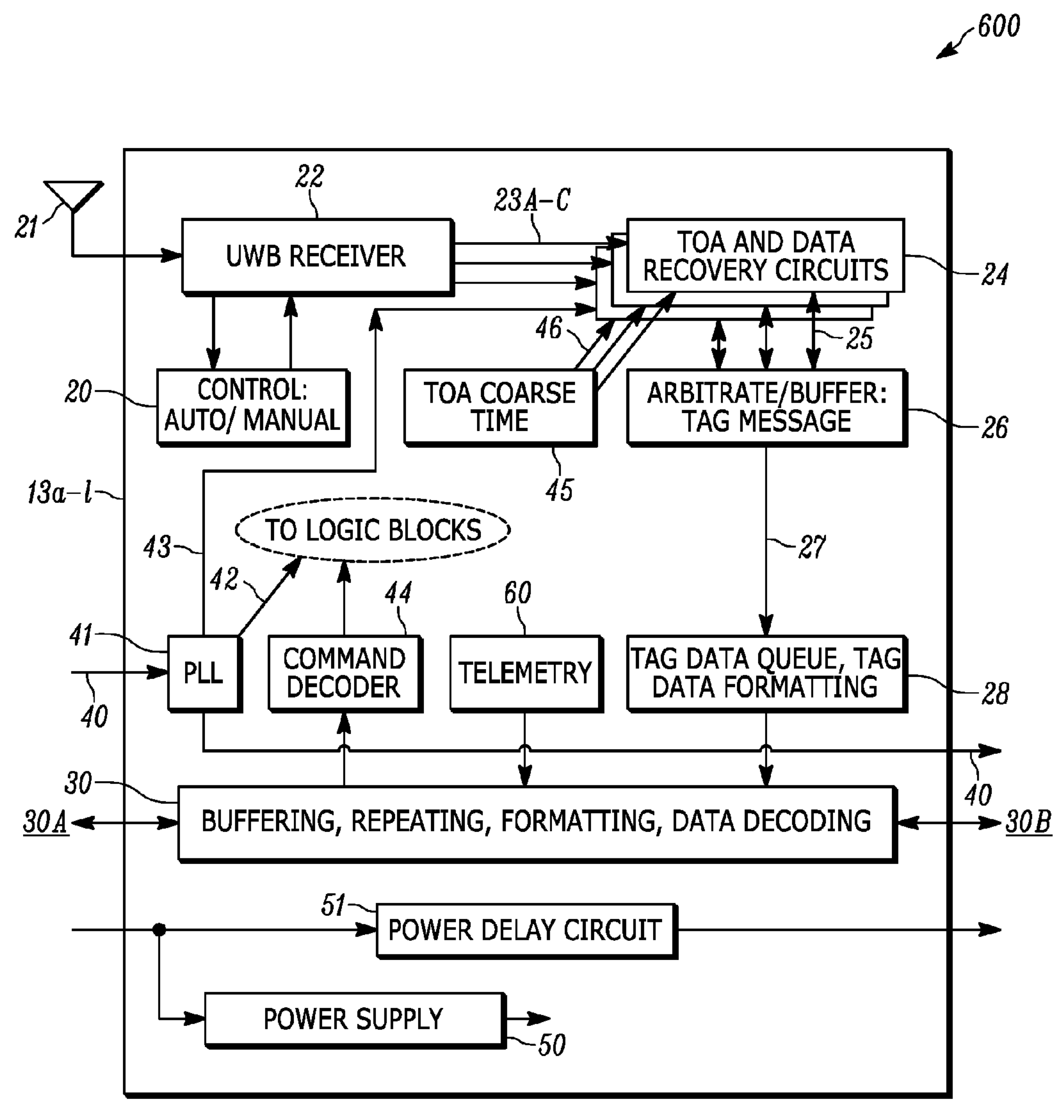
Figure 7:
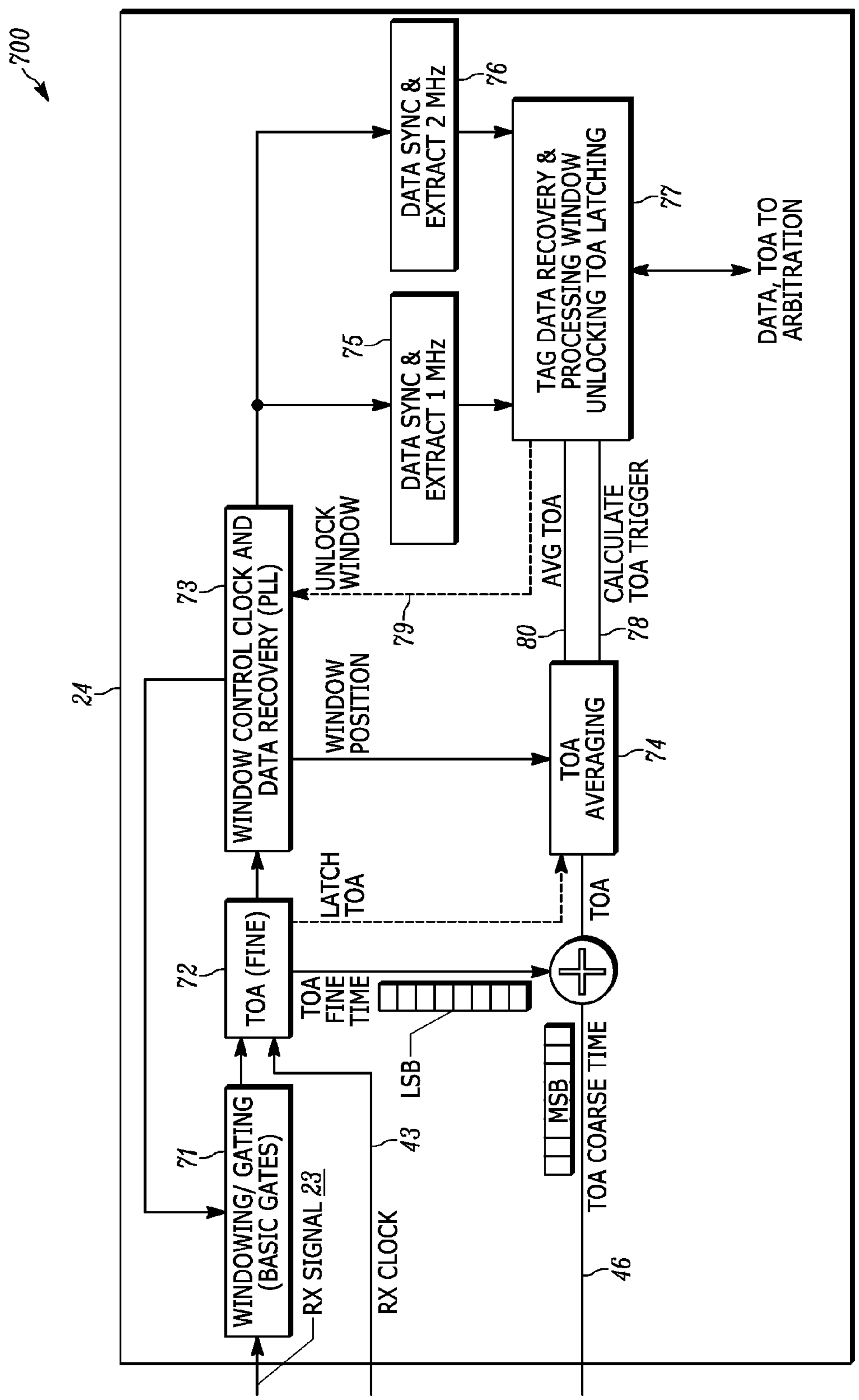

Having thus described the invention in general terms, reference will now be made to the accompanying drawings, which are not necessarily drawn to scale, and wherein:

FIG. 1 illustrates an exemplary bandwidth management function, in accordance with some example embodiments described herein;

FIG. 2A illustrates an exemplary database prepared and stored at the Central Processor/Hub for the bandwidth management function of FIG. 1, in accordance with some example embodiments described herein;

FIG. 2B illustrates an exemplary database prepared and stored at the Central Processor/Hub for a bandwidth management function associated with TOA receiver subsets, in accordance with some example embodiments described herein;

FIG. 3 illustrates the command pruning associated with the bandwidth management function for the TOA receiver subsets prescribed in FIG. 2B, in accordance with some example embodiments described herein;

FIG. 4 illustrates a flow chart enabling the method for the active bandwidth management system of a multiple receiver real-time location system (RTLS), in accordance with some example embodiments described herein;

FIG. 5 illustrates an exemplary environment using a radio frequency locating system for providing performance analytics in accordance with some embodiments of the present invention;

FIG. 6 illustrates an exemplary receiver in a RTLS system comprising a RTLS receiver that may be configured in accordance with some embodiments of the present invention; and FIG. 7 illustrates an example TOA and recovery circuit function from the exemplary receiver in the RTLS system of FIG. 6, in accordance with some embodiments of the present invention.

DETAILED DESCRIPTION OF THE INVENTION

Example embodiments of the present invention may include now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Processor for Bandwidth Management

Active radio frequency identification system (RFID) target location systems provide for transmitters incorporated with each target RFID tag and a grid of receivers to resolve a collection of time-of-arrival (TOA) measurements to locate a tag transmitter. Presently, active radio frequency identification (RFID) tag target location systems provide for approximately one nanosecond (ns) TOA accuracy and resolution at ranges up to 500 feet, depending on power requirements and regulations. In example embodiments, the present invention may include an active bandwidth management of a high-resolution TOA-based multiple receiver real-time location system (RTLS). A communication between a central processor or hub, responsible for converting the TOA packet data from the multiple receivers in a receiver grid into the RFID tag location estimates, and the receivers themselves, may direct which subset of receivers and which subset of packet data from each receiver is to be requested as a minimum TOA packet data for an accurate RFID tag location estimate for the one or more tags in the system.

The hub, in some examples, determines the minimum TOA packet data to request in conjunction with a channel capacity, a maximum bandwidth or data rate allowed by the communication channel associated with the multiple receiver target location system, and/or the like. The issues of correctly assembling critical and pertinent TOA packet data from each receiver, corresponding to location estimates for each RFID tag as a function of the data rate limitation are performed by the hub. As such, the hub may determine which TOA packet data to request from each receiver.

In some example embodiments, the subset of TOA packet data may exclude TOA packet data received from a subset of tags and/or the like. The subset of TOA packet data may exclude, in some examples, a combination of TOA packet data from a subset of receivers in the receiver grid, wherein the subset of packet data from the subset of the receivers itself may be receiver dependent and vary from receiver to receiver. In such an example exclusion, the hub may determine a minimum required packet data set from the multiple receivers necessary to determine an RFID tag location for the RTLS, wherein each minimum required TOA packet data set may correspond to a specific RFID tag or set of RFID tags.

FIG. 1 illustrates an exemplary bandwidth management function 100, in accordance with some example embodiments described herein. The bandwidth management function 100 for the real-time location system (RTLS) comprises a data packet 110 transmitted from one of one or more RFID tags in an RFID tag field (12*a-f*) to a receiver in a multiple receiver grid (13*a-i*), and a Central Processor/Hub 11 that communicates with the multiple receivers to determine location estimates for the RFID tags. The RFID tag field (12*a-f*), the multiple receiver grid (13*a-i*), and the Central Processor/Hub 11 physical layout is illustrated in FIG. 5.

A receiver 13*a*, for example, in the receiver grid (13*a-i*), processes the data packet 110 transmitted from and RFID tag 12*a*, for example, from the RFID tag field (12*a-f*), to determine a time-of-arrival (TOA) associated with the data packet 110. A collection of TOAs associated with the RFID tag 12*a*, attributed to one or more receivers, each similar to the receiver 13*a*, from the receiver grid (13*a-i*), is used by the Central Processor/Hub 11 to estimate the location of the RFID tag 12*a*. A detailed block diagram illustrating the receiver 13*a* functional blocks and communication with the Central Processor/Hub 11 is given in FIGS. 6-7.

FIG. 1 provides for a set of receiver 13*a*, for example, functions that communicate with the Control Processor/Hub 11 to determine which of the TOAs calculated by the receiver 13*a* are sent to the Central Processor/Hub 11 to estimate the location for the RFID tag 14*a*, for example. Functional blocks for the bandwidth management system 100, as illustrated in FIG. 1, include the data packet 110 and a TOA determination and data recovery function 24, here shown separately to make clear the data flow emanating from the data packet 110.

A preamble code and a synchronization bits fields from the data packet 110 are grouped and identified as transmitted (TX) pulse data 120, used by the TOA determination function 24 to determine the TOA associated with the RFID tag 12*a*. A transmitter identification, a data words 1-2, and a CRC field are grouped and identified as transmitter identification data (TX ID) 130, used by the data recovery function 24 to identify the RFID tag 13*a*, for example, and provide for augmenting data.

Functional blocks for the bandwidth management system, as illustrated in FIG. 1, further include an arbitrate buffer function 26, which selects from a parallel set of TOAs provided for by the TOA determination function 24 a TOA best suited for the RF environment. The arbitrate buffer function 26 prepares a tag message 27, described in FIG. 6, comprising the selected TOA, the TX ID, and other pertinent data associated with the data words and CRC, and sends the tag message 27 to a message filtering function 27'.

The message filtering function 27' comprises a message queue 27A', a message filtering functional block 27B', and a transmit (TX) queue 27C', whereby a queue of tag messages 27 is filtered and pruned such that a tag message subset 27 is sent to a buffering/repeating/formatting/decoding functional block 30 to activate synchronous communication with the Central Processor/Hub 11 on data lines 30A-B. Synchronous transmissions from the receiver 13*a*, for example, to the Central Processor/Hub 11 are summarized by the transmit (TX) TOA data block 140.

The bandwidth management system 100, as illustrated in FIG. 1, further includes a command decoder 44 that decodes commands sent from the Central Processor/Hub 11 to the receiver 13*a*, for example, on data line 30A-B, and distributes the decoded commands to the correct functional blocks in the receiver. In FIG. 1, the command decoder 44 is shown relaying commands to the message filtering block 27B'. Message filtering 27B' commands are represented pictorially by the curved arrows associated with a command block (CMMD) 150.

At the core of the bandwidth management system 100, illustrated in FIG. 1, is a feedback loop. The feedback loop is represented by the forward feed of the TX TOA data 140 from the receiver to the Central Processor/Hub 11, and the feedback, the command block 150, from the Central Processor/Hub 11 back to the receiver. Specifically, the Central Processor/Hub 11 acts as a function in the feedback, mapping TX TOA data 140 onto commands 150. As such, the feedback loop provides for the precepts that govern the bandwidth management system 100.

The receiver 13*a*, for example, provides the Central Processor/Hub 11 with the TX TOA data block 140 that comprises at least an RFID tag identification (TX ID) and TOA, along with a sequence number (Seq. No.) to identify the TOA instance, the specific TOA defined by the RFID tag and time tag, any associated data contained in at least a data word header (00) and data words 01-04, and a TX queue size message indicating the relative fullness of the TX queue 27C'.

In some embodiments, the TX queue 27C' may repeatedly and periodically provide for a fullness level, the TX queue size, to be accessed by the buffering function 30 for transmission to the Central Processor/Hub 11. The TX queue size may, in some examples, provide for a fullness level report that the TX queue 27C' is 1/16, 1/8, 1/4, and 1/2 full.

In some embodiments, the TOA TX data 140 may be transmitted from the buffering function 30 resident at the receiver 13*a*, for example, to the Central Processor/Hub 11 at a transmission (TX) rate approximately equal to a repetition rate associated with an RFID tag data packet. In this example, it is expected that the tag messages 27 generated from the RFID data packets may enter the message queue 27A' at approximately the same rate that the tag messages exit the TX queue 27C', and are subsequently transmitted to the Central Processor/Hub 11 as a TOA TX data block 140. As such, it is not expected that any type of message filtering would be required.

In some examples, the TX queue size may not be transmitted from the receiver 13*a*, for example, each and every time there is a TX TOA data 140 transmission from the receiver to the Central Processor/Hub 11. In some embodiments, both the TX queue size and TX TOA data 140 may be transmitted at approximately 1 Hz (1 TX/sec). In other embodiments, the TX queue size transmission rate and the TX TOA data 140 transmission rate may be 0.1 TX/sec and 1 TX/sec, respectively. In some embodiments, the TX queue size transmission rate and the TX TOA data 140 transmission rate may be 1 TX/sec and 12 Tx/sec, respectively.

In some embodiments, the TOA TX data 140 may be transmitted from the buffering function 30 resident at the receiver 13*a*, for example, to the Central Processor/Hub 11 at a transmission (TX) rate less than the repetition rate associated with an RFID tag data packet. In this example, it is expected that the tag messages 27 generated from the RFID data packets may enter the message queue 27A' at a greater rate than the tag messages exit the TX queue 27C', and subsequently transmitted to the Central Processor/Hub 11 as the TOA TX data block 140. As such, it is expected that, in time, one or more of the TX queue size fullness level reports is generated by the TX queue 27C'.

In response to the TX TOA message block 140 report from the receiver that the TX queue size is 1/16, 1/8, 1/4, and 1/2 full, for example, the Central Processor/Hub 11 is activated to prepare a command block 150 message to feedback to the receiver 13*a*, for example, to perform a data compression on any or all tag message 27 entries in the TX queue 27C' and to preempt the transmission of any and all TX TOA data and data blocks 140 deemed redundant or unnecessary in performing the RFID tag location estimates at the Central Processor/Hub 11.

At least two critical issues need be addressed: (1) conditions that require data compression and tag message 27 filtering, as dictated by the command block 150, and (2) message filtering 27B' itself, the collection of commands comprising the command block 140, and their functions.

Firstly, the conditions that may require preemptively removing RFID tag message 27 entries from the TX queue 27C' may be summarized by, but are not limited to, an insufficient channel capacity or data rate limit associated with the data lines 30A-B; that is, insufficient to transmit tag messages 27 to the Central Processor/Hub 11 at a data rate at least as fast as the tag messages 27 fill the message buffer 27A'.

The TX queue size, discussed previously with regard to the TX TOA data block 140, provides for an indication of the message buffer and TX queue fullness, and may trigger the Central Processor/Hub 11 to send a command in the command block 150 to the receiver 13*a*, for example, to perform a data compression on any or all the tag messages 27 or to reduce the number of tag messages 27 in the message queue 27A'. As such, the TX TOA data rate, coupled with the data compression of the tag messages 27 and the repeated removal from the message queue 27A' of redundant or unnecessary tag messages 27, may effectively allow for the message queue 27A' to empty at a rate comparable to the TX data rate, restoring both the message and TX queues 27A,C to a steady-state equilibrium.

Secondly, the message filtering method itself, the collection of commands comprising the command block 140, and their functions, may be selected strictly as a function of the TX queue size reported from the receiver 13*a*, for example, or may be a function of a combination of the data in the TX TOA data block 140 transmitted to the Central Processor/Hub 11. Specifically, the message filtering may be a combination of the TX queue size, the RFID tag TOA and associated ID and Seq. No., and an auxiliary data, all provided for by the TX TOA data block 140.

FIG. 1 illustrates an example message filtering 27B' embodiment, whereby the Central Processor/Hub 11 has issued a command from the block 150 to remove the third and fifth tag message 27 entries from the message queue 27A'. The third and fifth tag message 27 entries are shown deleted from the TX queue 27C' in FIG. 1. The command to remove the third and fifth tag message 27 entries was received by the receiver 13*a*, for example, buffer block 30 by data lines 30A-B, then decoded by the command decoder 44 to enact the removal process. Curved arrows are shown in FIG. 1 as an abstraction to better represent the concept.

The third and fifth tag message 27 entries, as with all tag message entries in the message and TX queues 27A',C', are assigned a sequence number (seq. no.). The seq. nos. are assigned according to an arrival time at the receiver 13*a*, for example, of the TOA packet data 110 associated with the tag message 27. In some embodiments, the seq. no. may be assigned according to an arrival time of the associated TOA and tag message 27 at the head of the message queue 27A'. Seq. nos. are effectively synchronized across the receivers 13*a-i* in the receiver grid by the RFID tag 12*a-f* transmission, whereby for all practical purposes with respect to the tag messages 27, for each RFID tag 12*a*, for example, the TX pulse data 120, that is, the preamble code and synchronization bits from the TOA packet data 110, arrives at each of the receivers 13*a-i* in the receiver grid simultaneously.

The commands in the command block 150 to perform a data compression of the tag message 27 entries and to remove the tag message 27 entries from the message and TX queues 27A',C' include at least the following: (1) compact mode, (2) shorten ID, (3) CRC:LSB, and (4) pruning. Commands (1)-(3) comprise the data compression commands; command (4), the pruning command, provides for a tag message 27 removal process. The Central Processor/Hub 11 selects the appropriate command from the command block 150 according to one or more of the TX TOA block 140 data transmitted from the receivers 13*a-i* in the receiver grid. A description of the commands comprising the command block 140 is given the next set of paragraphs.

(1) The compact mode command removes all seq. nos. from the message and TX queues 27A',C' where the tag message 27 associated with the given seq. no. comprises a TX ID that is greater than four bytes (32 bits) long. Additionally, the compact mode command reduces the size of the header data field from 16 bits to 8 bits, and limits the number of data bytes transmitted from the receiver, for example receiver 13*a*, buffer 30, from a maximum of five data bytes 00-04, including the data byte header (00), to a minimum of zero data bytes (0 bits). A communication of a global and/or individual receiver line end command, transmitted from the last receiver in a daisy chain of receivers, echoes whether the compact mode has been invoked by the Central Processor/Hub 11, in some examples. Under normal operation, in the absence of a compact mode invocation, the data byte header includes, in some examples, an indication of the number of data bytes transmitted.

(2) The shorten ID format command removes one byte (8 bits) from the two byte header information in the TOA packet data 110, as indicated by the first bit of the header. Also, the shorten ID format command provides for a mask for the two most significant bytes (MSBs) for the TX ID in the TOA data packet 110, such that the seq. no. with TX ID MSBs that do not match the mask are removed from the message and TX queues 27A',C'. Further, for seq. nos. remaining in the TX queue 27C', only the two least significant bytes (LSBs) are transmitted from the receiver, for example receiver 13*a*, by buffer 30, to the Central Processor/Hub 11.

(3) The CRC:LSB mode removes the MSB (8 bits) from the CRC error correcting code from all seq. nos. in the message and TX queues 27A',C'. The CRC:LSB command, in some examples, is given in conjunction with the compact mode and shorten ID format commands. The necessary length of the CRC is a function of the length of the full tag message. Shortening the tag message by enacting one or more of the compact mode and shorten ID format commands allows for a shorter CRC. The CRC:LSB command acknowledges this by explicitly commanding a shorter CRC for every seq. no. in the message and TX queues 27A',C'.

(4) The pruning command provides for several options of pruning collections or groupings of seq. nos. from the message queue 27A'. A first option for pruning a collection of seq. nos. from the message queue 27A' is for the Central Processor/Hub 11 to select a range of seq. nos for removal, whereby the seq. no. range directly corresponds to a time interval. In one embodiment, the time interval selected may be periodic. In another embodiment, the selected time range corresponding to the seq. no. range may coincide with a time frame deemed by the Central Processor/Hub 11 selection logic to be redundant or uninteresting. In still another embodiment, the selected time range corresponding to the seq. no. range may be arbitrary.

In one embodiment, the arbitrary seq. no. range or set of ranges may provide for a fractional reduction in the total no. of seq. nos. present in the TX queue 27C'. In an example embodiment, a six bit pruning code may be included as part of the pruning command in the command block 150 to encode the fractional reduction in seq. nos. In some examples, the pruning code may provide for a command to reduce the number of seq. nos. in the TX queue 27C' by one of the fractional amounts 1/16, 1/8, and 1/4.

Each of the aforementioned commands from the command block 150, in accordance with described embodiments, is provided for by the Central Processor/Hub 11 selection logic based strictly on the TX queue size data returned to the Central Processor/Hub 11 in the TX TOA data block 140 from the receivers 13*a-f* in the receiver grid. As previously described, the TX queue size provides for, at each of the receivers 13*a-i* in the receiver grid, a fullness level of 1/16, 1/8, 1/4, and 1/2 full. Provided the TX queue size input from the receivers 13*a-i*, the Central Processor/Hub 11 selection logic determines which combination, if any, of the previously described commands from the command block 150 to prescribe to compress and reduce receiver 13*a-i* TX TOA data block 140 transmissions in an effort to manage the bandwidth of the RTLS.

A second option for pruning a collection of seq. nos. from the message queue 27A' is for the Central Processor/hub 11 to select seq. nos. corresponding to unused and invalid RFID tags 12*a-f*. In one example, an RFID tag 12*a-f* may be determined unused if a location estimate associated with the RFID tag 12*a*, for example, is determined to be from an unused region. An example may be a static cargo inventory, whereby cargo located in a permanent storage may be no longer tracked.

In another example, an RFID tag 12*a-f* may be determined invalid if a location estimate associate with the RFID tag 12*a*, for example, is determined to be one or more of physically not possible, not stable, 'skipping' and 'jumping' intermittently between two or more location estimates, and indeterminate. In each of the invalid determinations, as with the unused determination, the seq. no. selection logic, as performed by the Central Processor/Hub 11, requires the formation of a location estimate for the examined RFID tags 12*a-f*.

The second option for the pruning command requires a location estimate for each of the RFID tags 12*a-f* represented in the TX queue 27C', resident at each of the pertinent receivers 13*a-i*. The pruning command associated with the location estimates calculated by the Central Processor/Hub 11 requires the IDs and TOAs from the TX TOA data block 140, in addition to the TX queue size. The seq. nos. are required to tie the RFID tag identification and TOA back to the TX queue 27C'. The TX queue size provides an indication as to whether and when to activate the bandwidth management function 100.

Calculation of RFID tag 12*a-f* location estimates provided for by the Central Processor/Hub 11 may yield RFID tag location estimates that are one or more of physically not possible, not stable, 'skipping' and 'jumping' intermittently between two or more location estimates, and indeterminate. The results for the RFID tag location estimates, based on the TOAs encapsulated by the TX TOA data block 140, the several instantiations of the unused and invalid location estimates, map directly onto the pruning indicia.

Each of the aforementioned commands and embodiments of commands, associated with the command block 150, to assert a bandwidth management function 100, requires either the TX queue size or the RFID tag TOA, accompanied by the corresponding RFID tag IDs and seq. nos., or both. In yet another embodiment, a pruning command may be issued by the command block 150 from the Central Processor/Hub 11 to the receivers 13*a-i*, whereby the pruning may focus on seq. nos. determined or tagged as invalid by a data word in the TX TOA data block 140. The invalidity of a seq. no. or set of set of seq. nos. may be determined by the arbitrate buffer function 26 in the receiver 13*a*, for example, whereby the arbitrate buffer function 26 may determine that the TOA determination function 24 did not successfully converge to a solution or a realizable solution.

FIG. 2A illustrates an exemplary database 200A prepared and stored at the Central Processor/Hub 11 for the bandwidth management function 100 of FIG. 1, in accordance with some example embodiments described herein. The database 200A prepared by the Central Processor/Hub 11, prepared in direct response to the TX TOA data block 140, comprising the RFID tag ID, seq. nos., corresponding TOAs, pertinent data words, and the TX queue size, reflects the effects of the command block 150.

Rows in FIG. 2A correspond to the RFID tags in the RFID tag field, and to specific instantiations of RFID tag TOAs, referenced by the corresponding seq. nos. Columns in FIG. 2A correspond to the constituent receivers 13*a-f*, for example, in the receiver grid, whereby each receiver 13*a-f* may potentially contribute a TOA measurement to the location estimate for the corresponding RFID tag.

In FIG. 2A, line segments represent seq. nos. to be removed from the TX queue 27C', solid blocks represent seq. nos. to remain in the TX queue 27C'. Each of the TX queues 27C', corresponding to one of the receivers in the receiver grid—in this example, TX queues 27' for receivers 13*a-f*—are addressed in the database 200A. As with FIG. 1, FIG. 2 shows the removal of the third and fifth tag message—that is, seq. nos. 0003 and 0005—for each of the receivers 13*a-f*.

The example embodiments given thus far provide for situations whereby like seq. nos. are removed from the TX queues 27C' for each and every corresponding receiver 13*a-i* in the receiver grid. Another possibility exists that different combinations of seq. nos. are removed from different receivers 13*a-i* in the receiver grid, providing for a richer implementation of the bandwidth management function 100. Such an implementation of the bandwidth management function is addressed in the following paragraphs.

FIG. 2B illustrates an exemplary database 200B prepared and stored at the Central Processor/Hub 11 for a bandwidth management function associated with TOA receiver subsets, in accordance with some example embodiments described herein. It is immediately clear by inspection of FIG. 2B that the seq. nos. removed from the receivers 13*a-f* TX queues 27C' vary from receiver to receiver. As such, the pruning command transmitted by the command block 150 itself may vary from receiver to receiver.

It can be appreciated that the receiver specific pruning outlined with respect to FIG. 2B provides for a more flexible bandwidth management function 200. For example, with receiver specific pruning, rather than the removing of RFID tags from TX queues 27C' across all receivers 13*a-i* in the receiver grid, it may be inferred by the receiver specific pruning that receivers themselves can be removed that do not represent constituent TOAs for location determination at the Central Processor/Hub 11 for the given RFID tag 12*a-f* or seq. no. This shift in pruning philosophy, from RFID tag based to receiver based, provides for a much richer bandwidth management system 200. Example embodiments of such a bandwidth management system, as outlined with respect to FIG. 2B, are presented in the following.

In the bandwidth management function given in FIGS. 1 and 2A, an invalid TOA for a seq. no. required the invalidation of that seq. no. across all receivers 13*a-i* in the receiver grid. In the present embodiment of the bandwidth management function 200, as presented by the database given in FIG. 2B, an invalid seq. no. from given receivers, receivers 13*a,e*, for example, may only invalidate those receivers for that seq. no., may only require the removal of the RFID tag message 27 for RFID tag 12*b*, for example, for seq. no. 0002. A remaining subset of receivers 13*b-d,f* may represent a sufficient receiver subset to constitute a location estimate for the RFID tag 12*b*.

Further, the invalidation of receivers 13*a,e*, as determined by data communicated to the Central Processor/Hub 11 in the TX TOA data block 140, may be specific to a limited number of RFID tags, RFID tags corresponding to seq. nos. 0002-3, 0006-8, in the example database 200B, given in FIG. 2B. That means that for other seq. nos., specifically seq. nos. 0001, 0004-5, the TOAs in the TX TOA data block 140 associated with these seq. nos. are not invalid. As such it may be possible, by deleting only the invalid seq. nos. at the correctly identified receivers, that a location estimate can be made for each and every RFID tag in this example, whereby the RFID tags correspond to seq. nos. 0001-8.

The invalidation of TOAs registered in the TX TOA data block 140, as previously suggested, may be determined by a location estimate, calculated at the Central Processor/Hub 11, whereby the location estimate may be one or more of physically not possible or out-of-range, not stable, 'skipping' and 'jumping' intermittently between two or more location estimates, and indeterminate. Additionally, the TOA as an output of the TOA determination function 24 resident at the receiver 13*a*, for example, may itself be determined invalid.

An invalid TOA may be due, for example, to excessive noise and echo or reverberation levels in the RF environment, which prevent an adaptive windowing function used at a detector to converge and register a TOA for the given RFID tag TX pulse data 120 associated with the RFID data packet 110. In another example, an invalid TOA may be due to a detection registered by the adaptive windowing function that represents a distance measurement that is clearly out-of-range.

In another example, the TOA registered by the TOA determination function 24 may itself 'skip' and 'jump' between two or more TOA registrations, providing for an intermittent TOA associated with a given RFID tag and receiver combination. In still another example, the signal-to-noise ratio (SNR) of the TX pulse data 120 may be too low to register a detection at the TOA determination function 24.

In each of these cases, the arbitration buffer function 26 determines an invalid TOA associated with the given RFID tag, receiver, and seq. no. combination, and encodes a data word in the TX TOA data block 140 accordingly for transmission to the Central Processor/Hub 11. The invalidity of the TOA data is provided for as a first layer error check, effectively preempting the series of error checks relying on location estimates made by the Central Processor/Hub 11, outlined previously, which may be considered as a second layer.

More specifically, the second layer error check for valid TOAs, TOAs as registered by the TOA determination function 24, relying on location estimates made at the Central Processor/Hub 11, may be categorized by one or more of a location estimate that is physically not possible or out-of-range, not stable or 'skipping' and 'jumping' intermittently, and indeterminate or under-defined.

In each of these cases, it may be such that it is not necessary to eliminate each and every seq. no. associated with bad TOAs that constitute invalid location estimates. That is, it may be possible that only a fraction of the constituent TOAs contribute to the location error, and as such, only a fraction of the constituent seq. nos. need be removed.

In an example embodiment, the second layer error check for TOA invalidity may function in conjunction with an iterative location estimate function, whereby the iterative location estimate function repeatedly estimates the location for the RFID tag 12*a*, for example, as indexed seq. no. 0001, which is constituted by TOAs from receivers 13*a-b,e*, in the example given in FIG. 2B.

In some examples, an iterative location estimate function, performed at the Central Processor/Hub 11, may not be provided with a sufficient number of TOAs to calculate a location estimate for the given RFID tag. As such, the location estimate for the given RFID tag is deemed indeterminate or under-defined.

At the other extreme, the iterative location estimate function at the Central Processor/Hub 11 may, in another example, be provided more TOAs than necessary to determine a location estimate for the given RFID tag. As such, the location estimate for the given RFID tag is deemed over-determined.

In the case of an over-determined location estimate, it may be determined that a subset of the TOAs, each associated with the given RFID tag 12*a*, for example, and a receiver 13*a-i* in the receiver grid, may be unnecessary, or moreover, even contribute to a location estimate error that was heretofore not detected by the first two error check layers.

The iterative location estimate function, acting effectively as a third layer error check, provides for redress of the TOAs that passed the first two error check layers, performed by the TOA arbitration function 26 and by the registration of gross location errors and anomalies by the Central Processor/Hub 11. That is, for an over-determined location estimate, the iterative location estimate function may pare away unnecessary and less accurate TOA measurements to make a more accurate location estimate. Upon removal of a subset of the TOAs used to constitute the location estimate for a given RFID tag 12*a*, for example, the Central Processor/Hub 11 may then collect all of the remaining associated seq. no. and receiver pairs in the pruning command for subsequent transmission as part of the command block 150 to the respective receivers.

The remaining seq. no. and receiver pairs necessary for the calculation of the location estimate may be considered a minimum subset of TOAs. The minimum subset TOA data packet 110 necessary for an accurate tag location estimate for each of the tags in the tag location system, the RTLS, alternatively or additionally, may be based on historical data, estimation, learning methods, Bayesian likelihood measures, messages from one or more receivers and/or some combination thereof.

Further, for each of the three layers of TOA error checks, as well as for each of the other pruning embodiments, and for the previously described data compression commands (1)-(3) comprising the command block 150, the functions described are dynamic. That is, the feedback loop between the receivers 13*a-i* in the receiver grid and the Central Processor/Hub 11, defined principally by the TX TOA data block 140 and the command block 150 exchange, changes in time to adjust for the dynamic environment associated with the RFID tag field.

One immediate advantage to a dynamic feedback system, according to the embodiments presented for the present invention, is the data rate may effectively be adjusted dynamically. This provides for a core tenet of the present active bandwidth management system. One example that demonstrates the advantage of a dynamic or active bandwidth management system is a simple level two pruning command to periodically remove seq. nos. associated with a given RFID tag 12*a*, for example, effectively lowering the TX TOA data block transmission rate for that given RFID tag. In this case, the periodic removal of seq. nos. may correspond to a lower velocity, as calculated by the Central Processor/Hub 11 for the given RFID tag, and as such, requires location estimate updates less frequently.

FIG. 3 illustrates the pruning command associated with the bandwidth management function 200 for the TOA receiver subsets prescribed in FIG. 2B, in accordance with some example embodiments described herein. FIG. 3 essentially represents graphically or pictorially the information presented for the database 200B associated with the aforementioned bandwidth management function 200, as described previously.

FIG. 4 illustrates a flow chart 400 enabling the method for the active bandwidth management system 100 of a multiple receiver RTLS, in accordance with some example embodiments described herein. The flow chart 400 provides for a step-by-step process 401 to apply the tenets of the three-layered error check that controls the TX queue 27C' fullness level, preventing overflow.

The process 401 starts with the receiver 13*a*, for example, receiving the data packet 110 transmitted from the RFID tag 12*a*, for example, step 405 in FIG. 4. Upon reception, the receiver 13*a* immediately begins processing the data packet 110, registering the TOA and extracting the TX ID and associated data words and CRC, by the TOA determination and extract TX ID functions 24.

Following the TOA determination function 24, the TOA arbitration buffer 26 selects from a set of parallel TOA determinations with varying threshold and detection levels. At this point, at least a detection failure, a detection inconsistency, a corrupted TOA, an out-of-range TOA, and combinations thereof provide for conditions whereby the TOA extracted and selected by the TOA determination 24 and arbitration 26 may be deemed invalid. The TOA validity check at the receiver 13*a*, for example, is incorporated in the TOA arbitration buffer function 26, and represented in the flow chart 400 as process 415A.

The TOA, TOA validity, and extracted TX ID and associated data words are collected in the tag message 27 and transferred serially to the message queue 27A', message filtering function 27B', and TX queue 27C', as shown in FIG. 1. Flow chart 400 contracts these three processes to the TX queue 27C', shown in FIG. 4. The TX queue 27C' functions as a first-in, first-out (FIFO) data buffer, as described previously in regard to FIG. 1.

In parallel to the process that loads the tag messages 27 into the TX queue 27C', a TX queue fullness 420A functions to continually provide for a measure of the TX queue 27C' buffer fullness level. The TX queue fullness function 420A reports one of at least five discrete fullness levels, that of 0 full, 1/16 full, 1/8 full, 1/4 full, and 1/2 full. The TX queue fullness level associated with the TX queue fullness function 420A is then combined in the TX TOA data block 140 with the tag messages 27, comprising at least the TOA, TX ID, associated data words and the CRC associated with the TX TOA data block 140 transmission, and an additional seq. no. corresponding to the specific TOA instantiation or timing. The TX TOA data block 140 is then transmitted in step 425A by respective receivers 13*a-i* to and received in step 425B by the Central Processor/Hub 11, as shown in FIG. 4.

Upon reception of the TX TOA data block 140, the Central Processor/Hub 11 unpacks (not shown) the tag messages 27, including seq. nos. and the TX queue fullness level 420A, and immediately checks the TX queue fullness level 420A by process 420B to determine whether or not it is necessary to perform a pruning function on the TX queue 27C'.

Regardless of whether or not the TX queue fullness test 420B returns an actionable fullness level, the process 401 is directed to perform a location estimate calculation 435, a function to estimate the location of the RFID tag 12*a*, for example, associated with the TOA, TX ID, and seq. no. received from receiver 13*a*, for example, and from the multiple remaining receivers 13*b-i*, for example, in the receiver grid.

The location estimate 435, as described previously in regard to FIG. 1, uses TOAs from multiple receivers 13*a-i* in the receiver grid, whereby the receivers in the receiver grid are approximately identical in form and function. The TOAs used by the location estimate function 435 is conditioned by a TOA valid test 415B, which evaluates the TOA validity associated with each RFID TX ID, seq. no., and receiver combination, as registered by the receiver-side TOA valid function 415A, described previously. As such, TOAs determined invalid by function 415A at the receiver and subsequently tested invalid by the TOA valid test 415B are not used in the location estimate function 435.

Following a location estimate 435, the process 401 is directed to test the location estimate for accuracy by a location estimate validity check 440. The location estimate validity check 440, as performed immediately following a first location estimate 435, checks for an RFID tag location estimate inconsistency, comprising one or more of a physically not possible location, an out-of-range location, an unstable location, a location that 'skips' and 'jumps' intermittently between two or more location estimates, and an indeterminate or under-defined location. Each of the RFID tag location inconsistencies is described in detail in regard to FIG. 1.

The occurrence of an invalid TOA 415B or an invalid location estimate 440 may prompt the process 401 to activate a remove TOAs function 430, whereby one or more TOAs associated with a specific tag message 27, a specific RFID TX ID, seq. no., and receiver combination, may be designated for removal from the TX queue 27C' at the associated receiver. The removal, in some cases, may be dependent on the status returned by the TX queue fullness test 420B, described previously.

The process 401 response to the TX queue fullness test 420B, TOA validity test 415B, and location estimate or first location estimate validity test 440 comprises a variety of bandwidth management functions, including at least a compact mode, shorten ID, CRC:LSB, and pruning function. Each of the bandwidth management functions are encapsulated in a command block 150, transmitted from the Central Processor/Hub 11 to the correct, designated receivers, as summarized by the TX:prune command 455, provided for in FIG. 4.

The TX:prune command 455 provides for commands in the command block 150 to remove tag messages, TOAs, TX IDs, and corresponding instantiations or seq. nos., from the specific receivers wherein the TOA was deemed invalid or corrupted. The Central Processor/Hub 11 TX:prune command 455 acts in anticipation of a TX queue 27C' overflow condition, commanding removal of tag message 27 entries in the TX queue in accordance with the guidelines provided for in FIG. 1, when alerted to the TX queue fullness level 420A, as reported from the multiple receivers 13*a-i* in the receiver grid.

Finally, the bandwidth management function may work in conjunction with an iterative location estimate function, whereby a new location estimate may be estimated with a subset of the original TOAs used to make the first location estimate, with the new location estimate compared to the first estimate and any preceding estimates by an error analysis. A feedback loop to summarize such an activity, described in regard to FIG. 1, is represented in FIG. 4 by the feedback loop incorporating a TOA subset select function 445 and a recalculate location estimate 450.

Following completion of the iterative location estimate function, a remaining subset of TOAs is deemed sufficient to constitute the best location estimate for the given RFID tag and instantiation or seq. no. The remaining TOAs may be regarded as unnecessary for the location estimate functions 435, 450. As such, it may be possible at this point to remove the unnecessary TOAs, by the remove TOA function 430, from the receiver-side TX queue 27C', by the TX:prune command 455 encapsulated in the command block 150.

The three layers of error check, the TOA validity 415A-B, the location estimate validity 440, and the recalculated or iterated location estimate comparison loop 445, 450, provides simple to sophisticated bandwidth control and management functions 100 to anticipate and prevent an overflow condition in the TX queues 27C' at the respective receivers 13*a-i* in the receiver grid. These concepts are summarized by FIGS. 1 and 4.

In some examples, the active bandwidth management system may provide for accurate and consistent tag location estimates with resolutions less than one foot, corresponding to a TOA resolution of less than one nanosecond (<1 ns), and may provide for such tag location estimates in a high-density tag field.

Example Real Time Locating System

FIG. 5 illustrates an exemplary locating system 500 useful for calculating a location by an accumulation of location data or time of arrivals (TOAs) at a central processor/hub 11, whereby the TOAs represent a relative time of flight (TOF) from RTLS tags 12*a-f* as recorded at each receiver 13*a*-1 (e.g., UWB reader, etc.). A timing reference clock is used, in some examples, such that at least a subset of the receivers 13*a*-1 may be synchronized in frequency, whereby the relative TOA data associated with each of the RTLS tags 12*a-f* may be registered by a counter associated with at least a subset of the receivers 13*a*-1. In some examples, a reference tag 14*a-b*, preferably a UWB transmitter, positioned at known coordinates, is used to determine a phase offset between the counters associated with at least a subset of the of the receivers 13*a*-1. The RTLS tags 12*a-f* and the reference tags 14*a-b* reside in an active RTLS field 18. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 13*a*-1.

In some examples, the system comprising at least the tags 12*a-f* and the receivers 13*a*-1 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 13*a*-1, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 12*a-f* may operate with an instantaneous −3 dB bandwidth of approximately 400 MHz and an average transmission below 187 pulses in a 1 msec interval, provided that the rate is sufficiently low. In such examples, the predicted maximum range of the system, operating with a center frequency of 6.55 GHz, is roughly 200 meters in instances in which a 12 dbi directional antenna is used at the receiver, but the projected range will depend, in other examples, upon receiver antenna gain. Alternatively or additionally, the range of the system allows for one or more tags 12*a-f* to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 5, the object to be located has an attached tag 12*a-f*, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 12*a-f* may be advantageously provided in order to permit, at a Central Processor/Hub 11, correlation of TOA measurement data from various receivers 13*a*-1.

In some examples, the tag 12*a-f* may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through intersymbol interference. In some examples, the tag 12*a-f* may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays. Echo (or multipath) delays result from reflections and, if sufficiently strong enough to be detected, avoiding data corruption Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that an regulated average power for a given time interval (e.g., a 1 msec time interval for an FCC regulated transmission).

Alternatively or additionally, additional sensor or telemetry data may be transmitted from the tag 12*a-f* to provide the receivers 13*a*-1 with information about the environment and/or operating conditions of the tag. For example, the tag may transmit a temperature to the receivers 13*a*-1. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 12*a-f* may be programmed to intermittently transmit data to the receivers 13*a*-1 in response to a signal from a magnetic command transmitter (not shown). The magnetic command transmitter may be a portable device, functioning to transmit a 125 kHz signal, in some example embodiments, with a range of approximately 15 feet or less, to one or more of the tags 12*a-f*. In some examples, the tags 12*a-f* may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 14*a-b*, may be positioned within and/or about a monitored region. In some examples, the reference tag 14*a-b* may be configured to transmit a signal that is used to measure the relative phase (e.g., the count of free-running counters) of non-resettable counters within the receivers 13*a*-1.

One or more (e.g., preferably four or more) receivers 13*a*-1 are also positioned at predetermined coordinates within and/or around the monitored region. In some examples, the receivers 13*a*-1 may be connected in a "daisy chain" 19 fashion to advantageously allow for a large number of receivers 13*a*-1 to be interconnected over a significant monitored region in order to reduce and simplify cabling, provide power, and/or the like. Each of the receivers 13*a*-1 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 12*a-f* and one or more reference tags 14*a-b*.

Each receiver 13*a*-1 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 11 having a central timing reference clock generator. The reference clock signal establishes a common timing reference for the receivers 13*a*-1. Thus, multiple time measuring circuits of the respective receivers 13*a*-1 are synchronized in frequency, but not necessarily in phase. While there typically may be a phase offset between any given pair of receivers in the receivers 13*a*-1, the phase offset is readily determined through use of a reference tag 14*a-b*. Alternatively or additionally, each receiver may be synchronized wirelessly via virtual synchronization without a dedicated physical timing channel.

In some example embodiments, the receivers 13*a*-1 are configured to determine various attributes of the received signal. Since measurements are determined at each receiver 13*a*-1, in a digital format, rather than analog in some examples, signals are transmittable to the Central Processor/Hub 11. Advantageously, because packet data and measurement results can be transferred at high speeds to a receiver memory, the receivers 13*a*-1 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 13*a*-1 to the Central Processor/Hub 11 (e.g., the data cables may enable a transfer speed of 2 Mbps). In some examples, measurement data is transferred to the Central Processor/Hub at regular polling intervals.

As such, the Central Processor/Hub 11 determines or otherwise computes tag location (i.e., object location) by processing TOA measurements relative to multiple data packets detected by the receivers 13*a*-1. In some example embodiments, the Central Processor/Hub 11 may be configured to resolve the coordinates of a tag using nonlinear optimization techniques.

In some examples, TOA measurements from multiple receivers 13*a*-1 are processed by the Central Processor/Hub 11 to determine a location of the transmit tag 12*a-f* by a differential time-of-arrival (DTOA) analysis of the multiple TOAs. The DTOA analysis includes a determination of tag transmit time $t_0$, whereby a time-of-flight (TOF), measured as the time elapsed from the estimate tag transmit time $t_0$ to the TOA, represents graphically the radii of spheres centered at respective receivers 13*a*-1. The distance between the surfaces of the respective spheres to the estimated location coordinates ($x_0$, $y_0$, $z_0$) of the transmit tag 12*a-f* represents the measurement error for each respective TOA, and the minimization of the sum of the squares of the TOA measurement errors from each receiver participating in the DTOA location estimate provides for both the location coordinates ($x_0$, $y_0$, $z_0$) of the transmit tag and that tag's transmit time $t_0$.

In some examples, the system described herein may be referred to as an "over-specified" or "over-determined" system. As such, the Central Processor/Hub 11 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean location of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

Where N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\epsilon$ in Equation 1 may be the Davidon-Fletcher-Powell (DFP) quasi-Newton algorithm, for example. In some examples, the optimization algorithm to minimize the error $\epsilon$ in Equation 1 may be a steepest descent algorithm. In each case, the algorithms may be seeded with an initial location estimate (x, y, z) that represents the two-dimensional (2D) or three-dimensional (3D) mean of the receiver positions of the receivers **13*a*-1** that participate in the tag location determination.

In some examples, the RTLS system comprises a receiver grid, whereby each of the receivers **13*a*-1 in the receiver grid keeps a receiver clock that is synchronized, with an initially unknown phase offset, to the other receiver clocks. The phase offset between any receivers may be determined by use of a reference tag that is positioned at a known coordinate position ($x_T$, $y_T$, $z_T$). The phase offset serves to resolve the constant offset between counters within the various receivers 13*a*-1**, as described below.

In further example embodiments, a number N of receivers **13*a*-1 {$R_j$: j=1, . . . , N} are positioned at known coordinates ($x_{R_j}$, $y_{R_j}$, $z_{R_j}$), which are respectively located at distances $d_{R_j}$ from a reference tag 14*a*-*b***, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{i_j}$, as given in Equation 4:

$$N_{i_j} = \beta\tau_i + O_j + \beta d_{i_j}/c \quad (4)$$

At receiver $R_j$ where $d_{i_j}$ is the distance between the object tag $T_i$ and the receiver **13*a*-1 $R_j$. Note that $\tau_i$ is unknown, but has the same constant value for all receivers $R_j$. Based on the equalities expressed above for receivers $R_j$ and $R_k$ and given the reference tag 14*a*-*b*** information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and reference tag are fixed and there is no multipath situation) and β is the same for each receiver. Note that $\Delta_{jk}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag **14*a*-*b* transmissions. Thus, again from the above equations, for a tag 12*a*-*f*** ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables ($x,y,z,t_0$) to reach a solution ($x',y',z',t_0'$).

Example Receiver Architecture

FIG. 6 illustrates an exemplary receiver **13*a*-1 in a UWB receiver system 600 comprising a UWB receiver that may be configured in accordance with some embodiments of the present invention. In an example embodiment, data packets 120 are transmitted to the receivers 13*a*-1 and intercepted by UWB antenna 21. A UWB receiver 22 is provided at each receiver 13*a*-1**. The UWB receiver can, for example, be designed in accordance with the system described in commonly-owned U.S. Pat. No. 5,901,172, which is incorporated by reference herein in its entirety.

UWB receiver 22, provided for at receivers 13*a*-1, allows for an analog signal stream that is digitized, then processed by a UWB TOA and data recovery circuits 24. The analog stream is digitized by up to three or more parallel, concurrent, independent analog-to-digital convertors (ADCs) functioning with three distinct threshold levels, resulting in up to three or more digital data streams 23A-C that are sent to the UWB TOA and data recovery circuits 24. In some embodiments, the threshold levels applied to the analog signal stream in the UWB receiver 22 are a function of a signal-to-noise ratio (SNR) present in the communication channel. In some embodiments, the threshold levels are set dynamically as a function of one or more of an antenna preamp gain and an estimated RTLS tag range.

The UWB TOA and data recovery circuits 24 perform as many as three or more parallel, concurrent, identical signal processing functions on the three or more digital data streams 23A-C. The three or more UWB TOA and data recovery circuits 24 may be configured to receive data packets 120 that correspond to RTLS tags 12*a-f*. The UWB TOA and data recovery circuits 24 may provide for a packet framing and extraction function as part of the data recovery circuit, whereby an RTLS tag 12*a-f* identification may be extracted. The RTLS identification may be extracted by the TX identification field 120B of the data packet 120, as described previously. In some embodiments, the UWB TOA and data recovery circuits 24 are implemented by field programmable gate arrays (FPGAs). The TOA and extracted data packet is sent by TOA line 25 to an arbitrate/buffer function 26.

The arbitrate/buffer function 26 effectively selects the TOA line 25 data provided by the UWB TOA and data recovery circuits 24. The arbitrate/buffer function 26 selects the TOA line 25 that converges to the earliest TOA from the up to three or more TOA and data recovery circuits 24 driven by the digital data stream 23A-C. The arbitrate/buffer function 26 provides for a series of serial messages, or tag message 27, to send to a tag queue function 28, whereby each of the tag messages 27 is identified by an RTLS tag 12*a-f* and an associated TOA. The tag message 27 may be temporarily stored by a tag message FIFO or queue to be filtered by a message filtering function 27', as discussed and detailed in FIG. 1.

The tag queue function 28 provides for a formatting and ordering of the collection of RTLS tag identifiers and TOAs, effectively a first-in first-out (FIFO) memory buffer awaiting a transmission to the central processor/hub 11. Upon a tag queue function 28 trigger, a tag data packet 29 is sent to a formatting and data coding/decoding function 30 that, in turn, repackages the tag data packet 29 and transmits a synchronous tag data packet 30B to the central processor/hub 11.

The synchronous tag data packet 30B transmitted by the formatting and data coding/decoding function 30 to the central processor/hub 11 is synchronized by a 10 MHz receiver clock 40, received from the previous receiver clock in the "daisy chain" 19, and transmitted to the next receiver clock in the "daisy chain" 19 following a synchronous frequency up/down convert. The receiver clock 40 drives a phase-locked loop (PLL) 41, whereby a frequency divider in a feedback loop in conjunction with a voltage-controlled oscillator (VCO) provides for a 100 MHz receiver clock 42-43 that is synchronized in phase to the 10 MHz receiver clock 40. The 100 MHz receiver clock 42 is provided to synchronize all logic blocks in the UWB receiver 13*a*-1 and to provide for a TOA coarse time 45, sent by line 46 to the TOA and data recovery circuits 24 to be used in the TOA determination. The 100 MHz receiver clock 43 provides for the parallel set of fine detector windows 340, a basis of a set of receiver timing windows used to capture and register pulses transmitted by RTLS tags 12*a-f* in the TOA determination, as described previously with respect to FIG. 3.

A second function of the formatting and data coding/decoding function 30 is a buffering, reformatting, and repeating of a central processor data 30A-B received and transmitted between the receiver 13*a*-1 and the central processor/hub 11 via the "daisy chain" 19 receiver network. The central processor data 30A-B received and transmitted from and to the formatting and data coding/decoding function 30 may provide for a series of commands that are decoded at a command decoder 44 to trigger receiver functions. A non-exhaustive list of such functions may include the following: an auto/manual control function 20, a series of telemetry functions 60, and the arbitrate/buffer function 26 to prune a data queue and to manage, delete, and reorder the data queue. The auto/manual control function 20 may be commanded—from manual mode—to report sensor information such as temperature and other telemetry data recorded in the telemetry function 60, and may be commanded to manually adjust one or more of an antenna preamp gain and the previously described threshold levels at the UWB receiver 22.

A power supply 50 may be configured to power the receiver 13*a*-1 by way of an AC-DC convertor, whereby the AC power may be provided as an input from the central processor/hub 11, shown in FIG. 5. The power supply 50 may be accompanied, in some embodiments, by a power delay circuit 51 to allow for an orderly 'power up' of sequential receivers 13*a*-1, thus avoiding a power surge and over-current event in the central processor data 30A-B transmission lines.

An advantage, in some examples, to the present embodiment of the UWB receiver system 600 is that packet data and measurement results can be transferred at high speeds to TOA measurement buffers, the arbitrate/buffer function 26, such that the receivers 13*a*-1 can receive and process tag 12*a-f* (and corresponding object) locating signals on a nearly continuous basis. That is, multiple UWB data packets 120 can be processed in close succession, thereby allowing the use of hundreds to thousands of tag transmitters.

In some embodiments, data stored in TOA measurement buffers, the arbitrate/buffer function 26, is sent to a central processor/hub 11, shown in FIG. 5, over the central processor data transmission lines 30A-B in response to a specific request from the central processor/hub 11.

In some embodiments, the collection of the central processor data 30A-B transmission lines, connecting a "daisy chain" 19 network of receivers, is comprised of two bi-directional data links. In some embodiments, these data links may be RS422 differential serial links. A network interface may receive command signals from a central processor/hub 11 on one link, for example, to instruct a transfer of the TOA measurement buffer, the arbitrate/buffer function 26, to the central processor/hub 11. Additional commands may include those to adjust UWB receiver 22 operating characteristics such as gain and detection thresholds. The bi-directional data links may also provide for a buffer for data signals linked between "daisy chain" 19 receivers, buffering sequential transmissions between the present and next receiver 13*a*-1 in a communications chain.

The synchronous frequency up/down convert performed on the 10 MHz receiver clock 40 provides for a driver for the receiver clock 40 transmitted to the next receiver in the "daisy chain" 19. An advantage of this approach, in some examples, is that the 10 MHz receiver clock 40 transmitted to the next receiver—as with the original 10 MHz receiver clock 40—may be made low enough in frequency so that it can be transmitted over low-cost cables (e.g., twisted pair wires). Since timing jitter of the local timing reference signal degrades as the PLL multiplier coefficient is increased, there is a necessary trade-off between frequency and jitter of the local timing reference signal and the frequency of the timing reference clock.

Utilizing a common 10 MHz receiver clock 40 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only, and not phase reference.

In some embodiments, the 10 MHz receiver clock 40 may comprise differential signals. The use of differential clock signals is advantageous since they avoid clock duty cycle distortion which can occur with the transmission of relatively high-speed clocks (e.g., >10 MHz) on long cables (e.g., >100 feet).

FIG. 7 illustrates an exemplary embodiment of the UWB TOA and data recovery circuits 700, presented in the UWB receiver system 600 as TOA and data recovery circuits 24, shown in FIG. 6, in accordance with some embodiments of the present invention. In an example embodiment, the UWB TOA data and recovery circuits 700 comprise a windowing/gating function 71, a TOA function 72, a window control clock and data recovery (PLL) function 73, a TOA averaging function 74, a data sync and extract function (1 MHz-2 MHz) 75-76, and a tag data recovery and processing function 77. The UWB TOA and data recovery circuits 700 process the digital data stream 23, shown in FIG. 6, to provide an unpacked data packet and the TOA associated with the RTLS tag to the arbitrate/buffer function 26.

The windowing/gating function 71 and the window control clock and data recovery (PLL) function 73 work as a feedback loop to recover the TX clock 101 and provide for the adjustable timing window function 200, as presented in FIG. 2, by tracking the RX pulses 111R' that comprise the RX pulse train 211R corresponding to the TX pulses 111T' in the series of TX pulses 111 in the preamble 110. The TOA function 72 works in conjunction with the 100 MHz receiver clocks 42-43. The RX clock 42 (201) provides for the TOA coarse time 46. The parallel set of fine detector windows 43 (340) provides for a TOA fine time associated with the RX fine timing window function 300, shown in FIG. 3, recording detections by a registration code 350 for the RX pulses 111R' that correspond to the sync code 112 TX pulses 111T'. The description for the adjustable timing window function 200 and the RX fine timing window function 300 are given previously with the presentation of FIGS. 2-3, respectively.

The TOA fine time—the registration code 350, the disjoint timing windows 231A-C, as determined by the adjustable timing window function 200, and the coarse time 46 are sent to the TOA averaging function 74, along with a latch TOA control signal indicating the end of a TOA determination. The TOA averaging function 74 is activated by a calculate TOA trigger 78, whereby the sub-window resolution function 400, as previously described with regard to FIG. 4, is initiated to determine the TOA with sub-window accuracy; that is, with resolution less than 1 nsec. The averaged TOA 80 is then sent to the tag data recovery and processing function 77.

The data sync and extract functions (1 MHz-2 MHz) 75-76 are triggered upon phase lock of the PLL associated with the window control clock and data recovery (PLL) function 73. Phase lock of the PLL is determined by the previously described feedback loop comprising the windowing/gating function 71 and the window control clock and data recovery (PLL) function 73, whereby the feedback loop effectively recovers the TX clock 101 by tracking the RX pulses 111R' corresponding to the preamble 110.

Upon phase lock, whereby the preamble 110 is synchronized to a recovered TX clock, the data packet 120, beginning with the remainder of the preamble 110, is extracted and unpacked by the data sync and extract function 75 (76) at a sampling rate of 1 Mhz (2 MHz), and sent to the tag data recovery and processing function 77. In another embodiment, the data sync and extract functions 75-76 are both set to sample the data packet 120 with a sampling rate of 2 MHz, but the two functions may differ by a data format. In one example, the data extracted by function 75 may follow a non-IOS format, where the data extracted by function 76 may follow an IOS format.

The tag data recovery and processing function 77 serves as a data processor for the data extracted by the data sync and extract functions 75-76 and as a communications control function, and also provides for data exchange associated with the arbitrate/buffer function 26, shown in FIG. 6. The data tag recovery and processing function 77 sends the TOA and data packet 120 information from the TOA averaging function 74 and the data sync and extract functions 75, 76, respectively, on TOA line 25 to the arbitrate/buffer function 26, which selects the earliest TOA from the three TOA functions running concurrently in the UWB TOA and data recovery circuits 700, and combines the TOA with the data packet 120 data into a tag message 27 to send to the tag data queue 28. At this point, the tag message 27 comprises at least the average TOA 80 and TX ID 120B extracted from the data packet 120 associated with the given tag transmission. The tag data queue 28, as described previously with respect to FIG. 6, effectively functions as a FIFO buffer for data transmission to the central processor/hub 11.

The tag data recovery and processing function 77 also serves as a controller for the timing of a triggering of the TOA averaging function 74 and a locking/unlocking 79 of the PLL in the window control clock and data recovery (PLL) function 73. The TOA averaging function 74 is initiated by the calculate TOA trigger 78 set by the tag data memory and processing controller 77, whereby the TOA trigger 78 is a function of a sync code 112 detection and a waiting interval associated with the data sync and extract function 75-76. The locking/unlocking 79 of the PLL is a function of a PLL lock indication initiated at the window control clock and data recovery (PLL) function 73, as described previously. And the locking/unlocking 79 of the PLL is reset to unlock the PLL upon detection in the sync and data extract functions 75-76 that the end of the data packet 120 has been reached, that the sampling of the data packet for the given tag transmission is complete.

The TOA averaging function 74 is elucidated by the sub-window resolution function 400, as described with regard to FIG. 4, and is initiated by the calculate TOA trigger 78. The TOA averaging function 74 may, in some examples, register a transition as successive RX pulses exhibit a change in detection registration, as demonstrated in FIG. 4. In another example, a TOA numerical average may be constructed to assign a TOA with sub-window resolution. A TOA numerical average may be constructed, according to FIG. 4, whereby RX pulses 1-5, for example, are assigned a weight equal to 4 nsec greater than the leading edge of the final center disjoint timing window 233B, and RX pulses 6-8 are assigned a weight equal to 3 nsec greater than the leading edge of the final center disjoint timing window 233B. As such, a TOA average is calculated as: 410 nsec+(5/8×14 nsec)+(3/8×13 nsec)=414 5/8 nsec.

Exemplary embodiments of the present invention have been described herein. The invention is not limited to these examples. These examples are presented herein for purposes of illustration, and not limitation. Alternatives (including equivalents, extensions, variations, deviations, etc., of those described herein) may be apparent to persons skilled in the relevant art(s) based in the teachings contained herein. Such alternatives fall within the scope and spirit of the invention.

All publications, patents, and patent applications mentioned in this specification are herein incorporated by reference to the same extent as if each individual publication, patent, or patent application was specifically and individually indicated to be incorporated by reference.

That which is claimed:

1. A method for bandwidth management in a multiple target location system, comprising:

receiving a transmission TOA message report from at least one receiver in a set of one or more receivers disposed about a monitored area, wherein the transmission TOA message report is generated based on a number of data packets that are stored in a receive buffer, wherein the data packets are received from a plurality of radio frequency identification tags, and the data packets are individually stored as a buffer element with a sequence number;

determining, by a processor hub, a buffer fullness level for the receive buffer, wherein the buffer fullness level is determined based on the transmission TOA message report;

determining, by the processor hub, a set of sequence numbers of buffer elements to be removed from the receive buffer in the at least one receiver based on the buffer fullness level; and communicating, to the at least one receiver, a message, wherein the message, when processed by the at least one receiver, is configured to cause the at least one receiver to remove, from the receive buffer, buffer elements based on the set of sequence numbers of buffer elements.

2. The method of claim 1, wherein determining the buffer fullness level for the receive buffer comprises determining a total number of buffer elements in the receive buffer based on the transmission TOA message report.

3. The method of claim 2, wherein the sequence numbers are associated with tag transmitters.

4. The method of claim 1, wherein the transmission TOA message report is received on a radio frequency communication channel.

5. The method of claim 1, wherein the transmission TOA message report is received on an RS-422 communication channel.

6. The method of claim 1, wherein determining the set of buffer elements to be removed further comprises determining, at the processor hub, a sequence number of a buffer element from the set of sequence numbers of buffer elements to be removed based on a buffer element having an invalid location estimate, wherein the determination of the invalid location estimate comprises a determination of one or more of a not physical location estimate, an out-of-range location estimate, a location estimate intermittently 'skipping' between two or more location estimates, and an under-determined location estimate; and including the sequence numbers of a buffer element in the set of sequence numbers of buffer elements to be removed.

7. The method of claim 6, wherein determining the invalid location estimate further comprises a determination of an updated location estimate with a subset of time-of-arrivals (TOA) and a subset of receivers used make the location estimate.

8. The method of claim 7, wherein determining the updated location estimate comprises an iterative feedback loop, wherein the iterative feedback loop compares an error function associated with the updated location estimate and the location estimate to determine a minimum error, and wherein, in an instance in which a buffer element of the set of buffer elements does not satisfy the minimum error, the buffer element is determined as having the invalid location estimate.

9. The method of claim 1, wherein the message comprises communicating one or more of a data compression command and a pruning command.

10. An apparatus for bandwidth management in a multiple target location system, wherein the apparatus comprises at least one processor and at least one memory including computer instructions configured to, when executed on the at least one processor, cause the apparatus to:

receive a transmission TOA message report from at least one receiver in a set of one or more receivers disposed about a monitored area, wherein the transmission TOA message report is generated based on a number of data packets that are stored in a receive buffer, wherein the data packets are received from a plurality of radio frequency identification tags, and the data packets are individually stored as a buffer element with a sequence number;

determine a buffer fullness level for the receive buffer, wherein the buffer fullness level is determined based on the transmission TOA message report;

determine a set of sequence numbers of buffer elements to be removed from the receive buffer in the at least one receiver based on the buffer fullness level; and communicate, to the at least one receiver, a message, wherein the message, when processed by the at least one receiver, is configured to cause the at least one receiver to remove, from the receive buffer, buffer elements based on the set of sequence numbers of buffer elements.

11. A computer program product for bandwidth management in a multiple target location system, the computer program product comprising a non-transitory computer readable storage medium and computer program instructions stored therein, the computer program instructions comprising program instructions, which when executed on a processor, configure the processor to:

receive a transmission TOA message report from at least one receiver in a set of one or more receivers disposed about a monitored area, wherein the transmission TOA message report is generated based on a number of data packets that are stored in a receive buffer, wherein the data packets are received from a plurality of radio frequency identification tags, and the data packets are individually stored as a buffer element with a sequence number;

determine a buffer fullness level for the receive buffer, wherein the buffer fullness level is determined based on the transmission TOA message report;

determine a set of sequence numbers of buffer elements to be removed from the receive buffer in the at least one receiver based on the buffer fullness level; and communicate, to the at least one receiver, a message, wherein the message, when processed by the at least one receiver, is configured to cause the at least one receiver to remove, from the receive buffer, buffer elements based on the set of sequence numbers of buffer elements.

* * * * *